United States Patent
Watanabe et al.

(10) Patent No.: US 7,627,560 B2
(45) Date of Patent: Dec. 1, 2009

(54) RECORDING AND REPRODUCING APPARATUS, PROCESSING METHOD IN THE APPARATUS, AND PROGRAM FOR CAUSING COMPUTER TO EXECUTE THE METHOD

(75) Inventors: Akihiro Watanabe, Kanagawa (JP); Tsuyoshi Takagi, Kanagawa (JP); Kenichiro Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 105 days.

(21) Appl. No.: 11/401,239

(22) Filed: Apr. 11, 2006

(65) Prior Publication Data

US 2006/0241798 A1 Oct. 26, 2006

(30) Foreign Application Priority Data

Apr. 22, 2005 (JP) ............................. 2005-125719

(51) Int. Cl.
*G06F 17/30* (2006.01)
*G06F 7/00* (2006.01)

(52) U.S. Cl. .................................. 707/3; 707/4; 707/10
(58) Field of Classification Search ........................ None
See application file for complete search history.

(56) References Cited

U.S. PATENT DOCUMENTS

| | | | |
|---|---|---|---|
| 6,434,520 B1 * | 8/2002 | Kanevsky et al. | 704/243 |
| 6,489,999 B1 * | 12/2002 | Okabe | 348/460 |
| 2003/0072556 A1 * | 4/2003 | Okujima et al. | 386/46 |
| 2006/0059535 A1 * | 3/2006 | D'Avello | 725/139 |
| 2006/0083483 A1 * | 4/2006 | Suzuki | 386/83 |

FOREIGN PATENT DOCUMENTS

| | | |
|---|---|---|
| JP | 11-266435 | 9/1999 |
| JP | 2001-042866 | 2/2001 |
| JP | 2001-177783 | 6/2001 |
| JP | 2002-062881 | 2/2002 |
| JP | 2002-73665 | 3/2002 |
| JP | 2003-059246 | 2/2003 |
| JP | 2003-281862 | 10/2003 |
| JP | 2004-046940 | 2/2004 |
| JP | 2004-140675 | 5/2004 |
| JP | 2005-004576 | 1/2005 |
| JP | 2005-011457 | 1/2005 |
| JP | 2005-025894 | 1/2005 |
| JP | 2005-72826 | 3/2005 |
| WO | WO 02/35516 | 5/2002 |
| WO | WO 2005/006608 | 1/2005 |

OTHER PUBLICATIONS

Suzuki Takuya Program Video Recorder, pp. 1-18, Oct. 24, 2004.*

* cited by examiner

*Primary Examiner*—Baoquoc N To
(74) *Attorney, Agent, or Firm*—Oblon, Spivak, McClelland, Maier & Neustadt, L.L.P.

(57) ABSTRACT

A recording and reproducing apparatus includes: a broadcast data holding unit that holds recorded broadcast data; a music data detecting unit that detects a start time and an end time of music data included in the broadcast data; a first song information acquiring unit that acquires first song information concerning the music data on the basis of the music data; an association information creating unit that creates information in which the music data, the broadcast data from the start time to the end time of the music data, and the first song information are associated with one another; and an association information holding unit that holds the information.

15 Claims, 20 Drawing Sheets

| | | | | |
|---|---|---|---|---|
| 351 BGM_ID | 001 | 002 | 003 | ..... |
| 352 BROADCAST DATA ID | 001 | 002 | 003 | ..... |
| 353 BGM TITLE | SONG A | SONG B | SONG C | ..... |
| 354 BGM ARTIST | ARTIST A | ARTIST B | ARTIST C | ..... |
| 355 GENRE A | POPS | POPS | POPS | ..... |
| 356 GENRE B | SAD SONG | HEALING SONG | SAD SONG | ..... |
| 357 BGM LOCATION | IN APPARATUS | PC1 | PC2 | ..... |
| 358 BROADCAST PROGRAM NAME | PROGRAM X | PROGRAM Y | PROGRAM Z | ..... |
| 359 START TIME CODE | 00:00:10 | 00:11:10 | 00:00:10 | ..... |
| 360 END TIME CODE | 00:01:10 | 00:12:10 | 00:01:10 | ..... |

FIG. 6A

| MESSAGE ID | SEQUENCE NUMBER | RESPONSE FLAG | PAYLOAD LENGTH | PAYLOAD |
|---|---|---|---|---|
| 001 | 10 | 0 | 10 | ..... |
| 002 | 11 | 1 | 15 | ..... |
| 003 | 12 | 2 | 20 | ..... |
| ⋮ | ⋮ | ⋮ | ⋮ | ⋮ |

FIG. 6B

| MESSAGE ID | TYPE OF MESSAGE |
|---|---|
| 001 | BGM DETECTION MESSAGE |
| 002 | BGM RECORDING CONTROL MESSAGE |
| 003 | BGM RECORDING CONTROL RESPONSE MESSAGE |
| 004 | BGM PLAY CONTROL MESSAGE |
| 005 | BGM RELATED INFORMATION ACQUISITION MESSAGE |
| 006 | BGM RELATED INFORMATION ACQUISITION RESPONSE MESSAGE |
| 007 | BGM DISPLAY CONTROL MESSAGE |
| 008 | BGM RELATED COMMODITY PURCHASE MESSAGE |
| 009 | BGM RELATED COMMODITY PURCHASE RESPONSE MESSAGE |

FIG. 7A

| MESSAGE ID | SEQUENCE NUMBER | RESPONSE FLAG | PAYLOAD LENGTH | BGM DETECTION STATUS |
|---|---|---|---|---|
| 001 | 1 | 0 | 1 | 1 |
| 001 | 2 | 0 | 1 | 0 |

FIG. 7B

| MESSAGE ID | SEQUENCE NUMBER | RESPONSE FLAG | PAYLOAD LENGTH | COMMAND NUMBER |
|---|---|---|---|---|
| 002 | 1 | 1 | 1 | 1 |

FIG. 7C

| MESSAGE ID | SEQUENCE NUMBER | RESPONSE FLAG | PAYLOAD LENGTH | BROADCAST DATA ID | TIME CODE |
|---|---|---|---|---|---|
| 003 | 1 | 2 | 15 | 001 | 00:00:10 |

FIG. 8A

| MESSAGE ID | SEQUENCE NUMBER | RESPONSE FLAG | PAYLOAD LENGTH | COMMAND NUMBER | BGM ID | BROADCAST CODE ID | TIME CODE |
|---|---|---|---|---|---|---|---|
| 004 | 1 | 1 | 15 | 1 | 005 | 003 | 00:00:10 |
| 004 | 2 | 1 | 1 | 0 | | | |

FIG. 8B

| MESSAGE ID | SEQUENCE NUMBER | RESPONSE FLAG | PAYLOAD LENGTH | COMMAND NUMBER | BGM_ID |
|---|---|---|---|---|---|
| 005 | 1 | 1 | 1 | 0 | 005 |
| 005 | 2 | 1 | 1 | 1 | 005 |

FIG. 8C

| MESSAGE ID | SEQUENCE NUMBER | RESPONSE FLAG | PAYLOAD LENGTH | BGM_ID | DISPLAY INFORMATION |
|---|---|---|---|---|---|
| 006 | 1 | 2 | 40 | 005 | 8TH SINGLE ..... SURE TO BE MUCH TALKED ABOUT IN AUTUMN 2005 |
| 006 | 2 | 2 | 40 | 005 | MP3, SINGLE CD ..... |

FIG. 9A

| MESSAGE ID | SEQUENCE NUMBER | RESPONSE FLAG | PAYLOAD LENGTH | COMMAND NUMBER | BGM ID | DISPLAY INFORMATION |
|---|---|---|---|---|---|---|
| 007 | 1 | 1 | 20 | 1 | 005 | SONGA: ARTIST A |
| 007 | 2 | 1 | 1 | 0 | | |

FIG. 9B

| MESSAGE ID | SEQUENCE NUMBER | RESPONSE FLAG | PAYLOAD LENGTH | COMMODITY ID | STORAGE DESTINATION NUMBER |
|---|---|---|---|---|---|
| 008 | 2 | 1 | 10 | 001 | 1 |
| 008 | 3 | 1 | 10 | 002 | 2 |

FIG. 9C

| MESSAGE ID | SEQUENCE NUMBER | RESPONSE FLAG | PAYLOAD LENGTH | COMMAND NUMBER |
|---|---|---|---|---|
| 009 | 2 | 2 | 1 | 1 |
| 009 | 3 | 2 | 1 | 0 |

FIG. 11
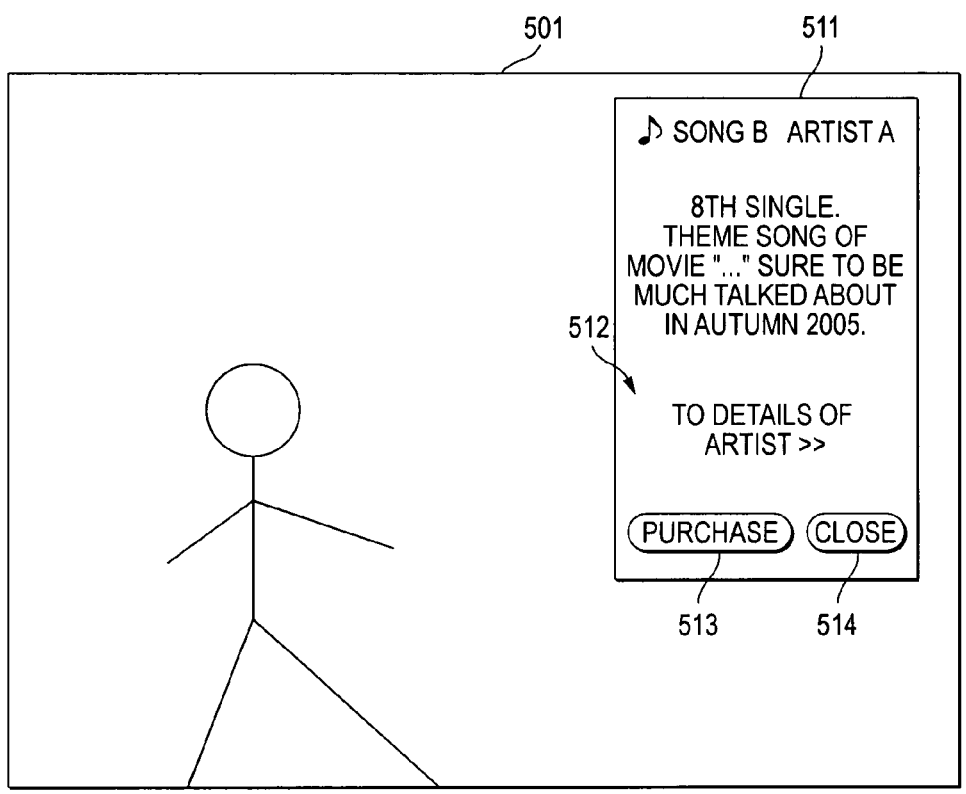
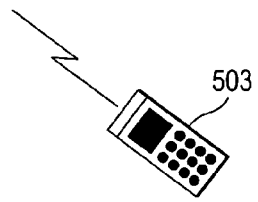

FIG. 13
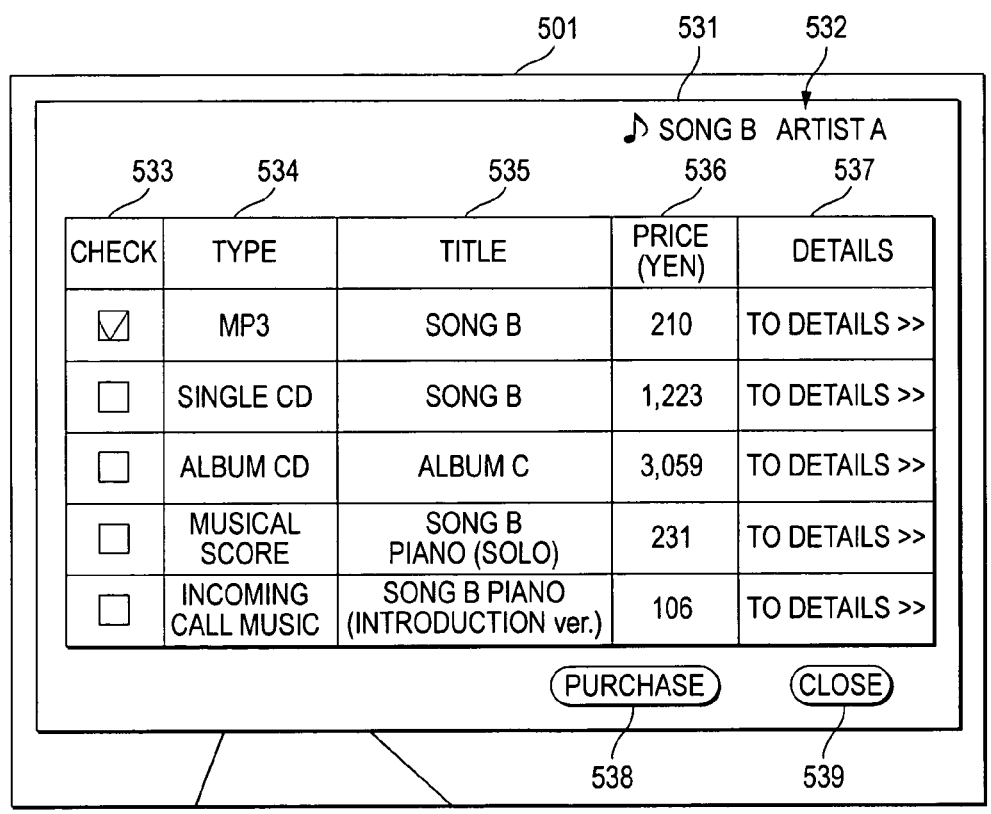
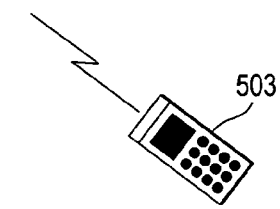

FIG. 15
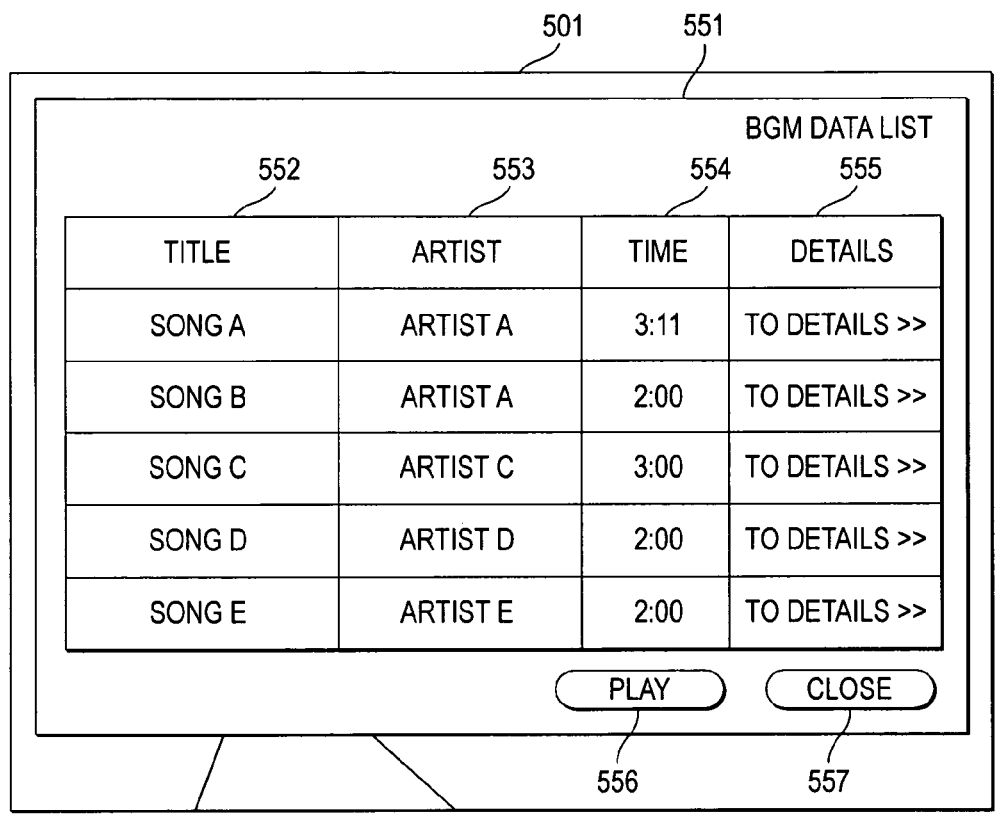
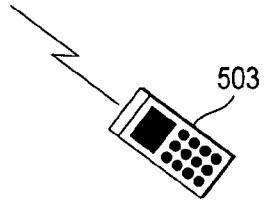

RECORDING AND REPRODUCING APPARATUS, PROCESSING METHOD IN THE APPARATUS, AND PROGRAM FOR CAUSING COMPUTER TO EXECUTE THE METHOD

CROSS-REFERENCES TO RELATED APPLICATIONS

The present invention contains subject matter related to Japanese Patent Application JP 2005-125719 filed in the Japanese Patent Office on Apr. 22, 2005, the entire contents of which being incorporated herein by reference.

BACKGROUND OF THE INVENTION

1. Field of the Invention

The present invention relates to a recording and reproducing apparatus that records and reproduces image data and sound data, and, more particularly to a recording and reproducing apparatus that presents information on background music (BGM) included in broadcast data, a processing method in the recording and reproducing apparatus, and a program for causing a computer to execute the method.

2. Description of the Related Art

In a television program, various kinds of BGM are played according to scenes to give certain effects to content of the television program. In the present age, since video apparatuses such as a television are spread to the general public, there is a significantly influence on viewers concerning music played through television programs. For example, it can be said that, in general, music and the like used in television dramas and the like are highly likely to be popular if the music and the like are put on the market. It is possible to check a title, an artist name, and the like of such BGM according to keyword search on the Internet. However, in order to perform the keyword search on the Internet, information for connecting the title, the artist, and the like with keywords is necessary as a premise for the keyword search.

It is convenient for viewers if it is possible to directly learn a title and an artist name of a song corresponding to BGM from BGM data without performing the keyword search using the Internet. In order to realize such a method, there is proposed an information providing system that searches through a server, which holds waveform curves of various types of music and titles and the like of songs in association with one another, to find a waveform curve similar to a waveform curve of BGM and provides a title and the like of a song corresponding to the waveform curve as a song corresponding to the BGM (see, for example, JP-A-2002-73665 (FIG. 2)).

SUMMARY OF THE INVENTION

In the information providing system described above, it is only possible to learn a title and the like of a song and it is difficult to watch videos of a television program or the like together with a title of a song corresponding to BGM. Thus, it is convenient for viewers if it is possible to watch videos of a television program together with information such as a title and an artist name of BGM of the television program.

It is also convenient if it is possible to purchase commodities related to the BGM from a screen on which the information such as the title and the artist name of the BGM of the television program, the video of the television program, and the BGM are simultaneously played and store the commodities purchased in an apparatus for viewing the television program or an apparatus connected to the apparatus via a network.

Thus, it is desirable to provide a recording and reproducing apparatus that holds videos and BGM of a television program and information such as a title and an artist name of the BGM of the television program in association with one another and simultaneously displays the videos and the BGM of the television program and the information such as the title and the artist name of the BGM of the television program on the basis of the association.

According to an embodiment of the invention, there is provided a recording and reproducing apparatus including: broadcast data holding means for holding recorded broadcast data; music data detecting means for detecting a start time and an end time of music data included in the broadcast data; first song information acquiring means for acquiring first song information concerning the music data on the basis of the music data; association information creating means for creating information in which the music data, the broadcast data from the start time to the end time of the music data, and the first song information are associated with one another; and association information holding means for holding the information. Consequently, there is an effect that information in which broadcast data, music data, and song information are associated with one another, that is, association information, is created. This makes it possible to simultaneously reproduce the broadcast data, the music data, and the song information on the basis of the association information. The first song information is metadata concerning a song. The association information is metadata in which the broadcast data, the music data, and the song information are associated with one another.

In the embodiment of the invention, the music data detecting means detects the start time and the end time of the music data on the basis of subtitle information in the broadcast data. Consequently, there is an effect that a start time and an end time of music data are detected using existing subtitle information.

In the embodiment of the invention, the recording and reproducing apparatus further includes song information holding means for holding the first song information concerning the music data. The song information acquiring means acquires the first song information from the song information holding means on the basis of the music data. Consequently, there is an effect that song information is acquired more efficiently than acquiring the song information from a server on the outside.

In the embodiment of the invention, the first song information acquiring means acquires a song name and an artist name of the music data as the first song information. Consequently, there is an effect that a song name and an artist name of music data in broadcast data are acquired as song information.

The first song information acquiring means further acquires detailed information concerning a song corresponding to the music data and detailed information concerning an artist corresponding to the music data as the first song information. Consequently, there is an effect that detailed information concerning a song corresponding to the music data and detailed information concerning an artist corresponding to the music data are acquired as the song information. The detailed information concerning the song is metadata concerning the song. The detailed information concerning the artist is metadata concerning the artist.

In the embodiment of the invention, the recording and reproducing apparatus further includes song data acquiring means for acquiring song data that is data for one song corresponding to the music data. Consequently, there is an effect that song data corresponding to music data is acquired.

The song data acquiring means includes song data sales information acquiring means for acquiring information on sales of the song data and operation means for causing a user to select the song data, which should be purchased, from the information. Consequently, there is an effect that song data or the like is purchased and acquired on the basis of information on sales of song data. The information on sales of the song data is metadata concerning sales of the song data.

The song data sales information acquiring means also acquires information on commodities related to the song data. Consequently, there is an effect that not only song data itself but also commodities related to the song data are acquired. The information on the commodities related to the song data is metadata of the commodities related to the song data.

The recording and reproducing apparatus further includes song data reproduction requesting means for requesting reproduction of the song data and display control means for causing a display unit to display the broadcast data held in association with the song data corresponding to the song data during reproduction of the song data. Consequently, there is an effect that song data and broadcast data are reproduced in association with each other. As a result, a song and a television program are easily associated with each other.

The song data reproduction requesting means includes music data list creating means for creating a list of the music data held by the association information holding means and operation means for causing a user to select music data, which should be requested, from the list of the music data. Consequently, there is an effect that music data included in broadcast data already recorded is notified to the user to cause the user to reproduce song data and broadcast data on the basis of the list of the music data.

The display control means causes the display unit to appropriately connect and display the broadcast data held in association with the music data corresponding to the song data during reproduction of the song data. Consequently, there is an effect that plural scenes of a television program related to song data are continuously reproduced during reproduction of the music data. As a result, a digest of a television drama or the like is created.

In the embodiment of the invention, the recording and reproducing apparatus further includes: second song information acquiring means for acquiring, on the basis of song data recorded in a recording medium, second song information concerning the song data, the song data being data for one song corresponding to the music data; song information searching means for searching through the association information holding means to find the first song information having content identical with that of the second song information; and song data reproducing means for reproducing the song data when the first song information having content identical with that of the second song information is found in the search. The display control means causes the display unit to display the broadcast data corresponding to the first song information during reproduction of the song data. Consequently, there is an effect that, on the basis of song data recorded in a recording medium, broadcast data of a television drama or the like related to the song data is reproduced. The second song information is metadata concerning a song.

According to another embodiment of the invention, there is provided a recording and reproducing apparatus, including: receiving means for receiving broadcast data; music data detecting means for detecting a start time and an end time of music data included in the broadcast data; song information acquiring means for acquiring song information concerning the music data on the basis of the music data; and display control means for causing a display unit to display the song information from the start time to the end time of the music data. Consequently, there is an effect that, when broadcast data is received and music data included in the broadcast data is outputted, song information concerning the music data is displayed on a real time basis. The song information is metadata concerning a song.

According to another embodiment of the invention, there is provided a recording and reproducing system, including: a recording and reproducing apparatus that includes: broadcast data holding means for holding recorded broadcast data; music data detecting means for detecting a start time and an end time of music data included in the broadcast data; song information acquiring means for acquiring song information concerning the music data on the basis of the music data; association information creating means for creating information in which the music data, the broadcast data from the start time to the end time of the music data, and the song information are associated with one another; and association information holding means for holding the information; and a song information holding server that holds song information concerning the music data. The song information acquiring means acquires the song information from the song information holding server on the basis of the music data. Consequently, there is an effect that information in which broadcast data, music data, and song information are associated with one another, that is, association information, is created. Song information concerning the music data is metadata concerning a song. The association information is metadata in which the music data, the broadcast data from the start time to the end time of the music data, and the song information are associated with one another.

According to another embodiment of the invention, there is provided a broadcast data processing method of executing the following steps or a program for causing a computer to execute the following steps in a recording and reproducing apparatus including broadcast data holding means for holding recorded broadcast data. The steps include the steps of: detecting a start time and an end time of music data included in the broadcast data; acquiring song information concerning the music data on the basis of the music data; creating information in which the music data, the broadcast data from the start time to the end time of the music data, and the song information are associated with one another; and holding the information. Consequently, there is an effect that information in which broadcast data, music data, and song information are associated with one another, that is, association information, is created. Song information concerning the music data is metadata concerning a song. The association information is metadata in which the music data, the broadcast data from the start time to the end time of the music data, and the song information are associated with one another.

According to another embodiment of the invention, there is provided a broadcast data processing method including the steps of or a program for causing a computer to executes the steps of: receiving broadcast data; detecting a start time and an end time of music data included in the broadcast data; acquiring song information concerning the music data on the basis of the music data; and causing a display unit to display the song information from the start time to the end time of the music data. Consequently, there is an effect that, when broadcast data is received and music data included in the broadcast data is outputted, song information concerning the music data is displayed on a real time basis. The song information concerning the music data is metadata concerning a song.

According to the embodiments of the invention, it is possible to realize an excellent advantage that videos and BGM of a television program and information such as a title and an artist name of the BGM of the television program are held in association with one another and the videos and the BGM of the television program and the information such as the title and the artist name of the BGM of the television program are simultaneously displayed on the basis of the association.

BRIEF DESCRIPTION OF THE DRAWINGS

In the accompanying drawings:

FIG. 5 is a table showing an example of a constitution of a BGM related information database 350;

FIGS. 6A and 6B are tables showing formats of messages and types of message IDs used in the embodiment of the invention;

FIGS. 7A to 7C are tables showing contents of messages with message IDs "001" to "003";

FIGS. 8A to 8C are tables showing contents of messages with message IDs "004" to "006";

FIGS. 9A to 9C are tables showing contents of messages with message IDs "007" to "009";

FIG. 11 is a diagram showing an example of the display screen on which a title and an artist name of a song corresponding to BGM data and detailed information concerning the song are displayed in the recording and reproducing apparatus 100 in the embodiment of the invention;

FIG. 13 is a diagram showing an example of the display screen on which song data sales information concerning a song corresponding to BGM data is displayed in the recording and reproducing apparatus 100 in the embodiment of the invention;

FIG. 15 is a diagram showing an example of the display screen on which a list of information concerning accumulated BGM data is displayed in the recording and reproducing apparatus 100 in the embodiment of the invention;

DESCRIPTION OF THE PREFERRED EMBODIMENTS

Embodiments of the present invention will be hereinafter explained in detail with reference to the accompanying drawings.

Figure 1:
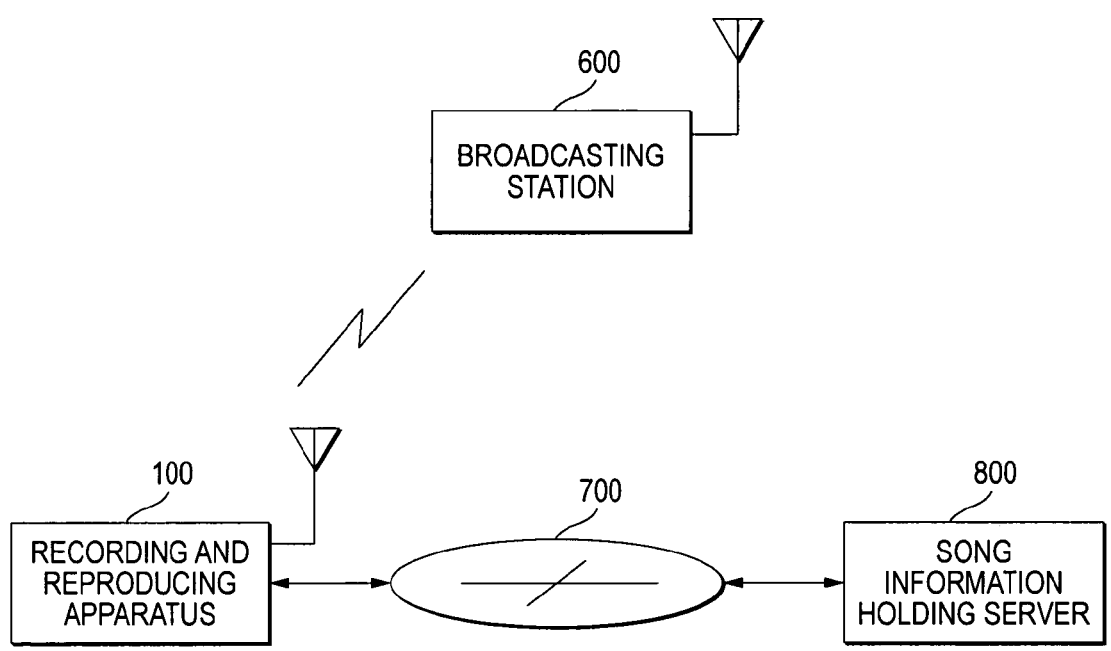
FIG. 1 is a diagram showing an example of a constitution of a recording and reproducing system in an embodiment of the invention.

FIG. 1 is a diagram showing an example of a constitution of a recording and reproducing system in an embodiment of the invention. This recording and reproducing system includes a recording and reproducing apparatus 100, a broadcasting station 600, a network 700, and a song information holding server 800. The number of broadcasting stations and the number of song information holding servers are not limited to one. Plural broadcasting stations and plural song information holding servers may be provided.

The recording and reproducing apparatus 100 receives broadcast data from the broadcasting station 600 and performs processing such as recording and reproduction of the broadcast data. When there are plural broadcasting stations, the recording and reproducing apparatus 100 may have plural tuners to be capable of simultaneously receiving broadcast data from the plural broadcasting stations. The recording and reproducing apparatus 100 also receives a title and an artist name of a song, detailed information concerning the song, and detailed information concerning the artist (a title and an artist name of a song, detailed information concerning the song, and detailed information concerning the artist are hereinafter generally referred to as "song information") and applies predetermined processing to the song information. The broadcasting station 600 transmits broadcast data that should be transmitted. It is assumed that the broadcast data includes image data, music data, and additional information data such as subtitle information. It is assumed that the broadcast data in this embodiment also includes broadcast data distributed through the network 700 such as the Internet.

It is assumed that the network 700 is, for example, the Internet. The network 700 may be other networks that use leased lines. The song information holding server 800 transmits, on the basis of waveform data of music transmitted to the song information holding server 800, a title and an artist name of a song corresponding to the waveform data, detailed information concerning the song, detailed information concerning the artist, and the like to a transmission source of the waveform data of the music. For example, a CD DataBase (CDDB) corresponds to the song information holding server 800.

Figure 2:
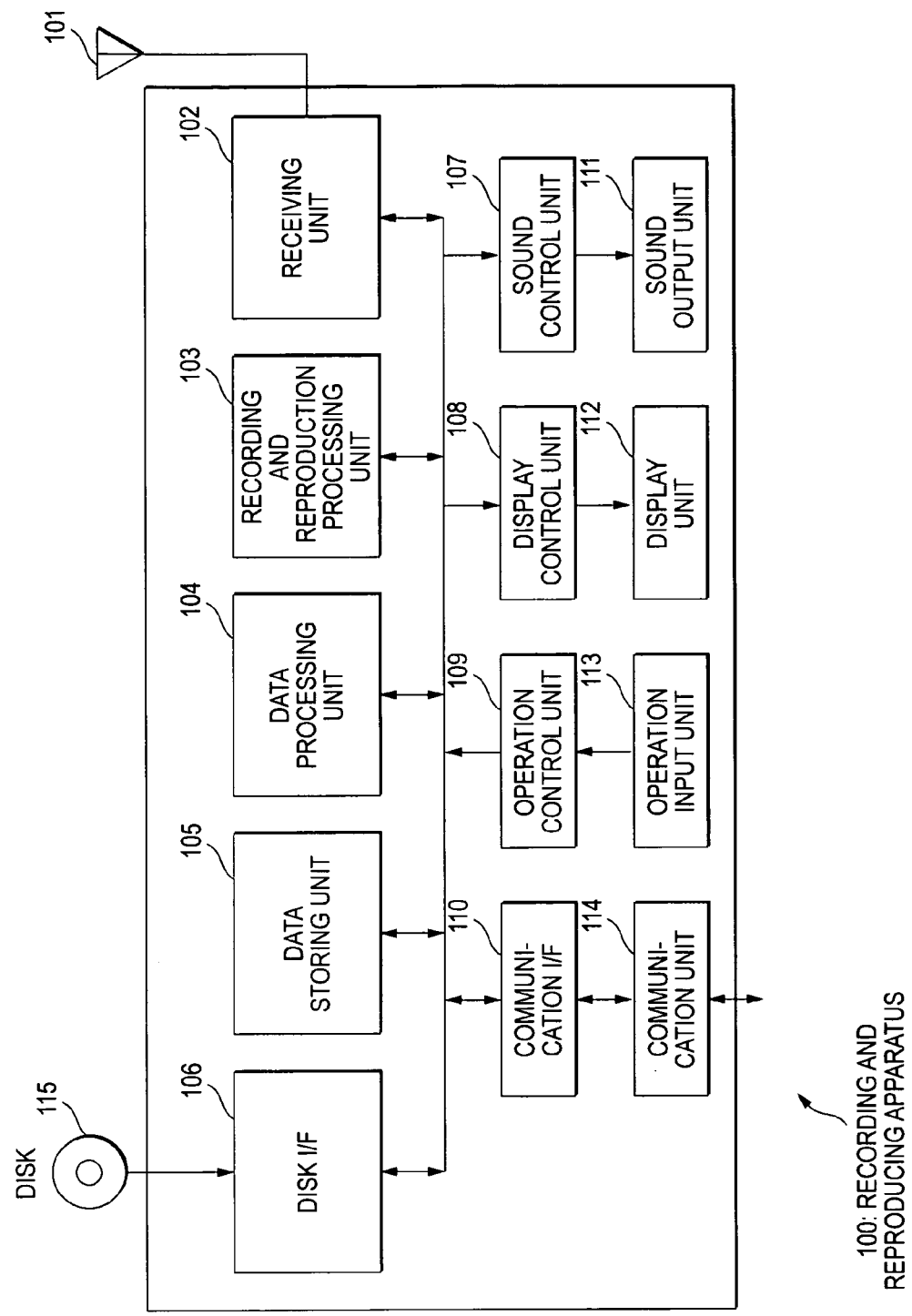
FIG. 2 is a diagram showing an example of a constitution of a recording and reproducing apparatus 100 in the embodiment of the invention.

FIG. 2 is a diagram showing an example of a constitution of the recording and reproducing apparatus 100 in this embodiment. The recording and reproducing apparatus 100 includes an antenna 101, a receiving unit 102, a recording and reproduction processing unit 103, a data processing unit 104, a data storing unit 105, a disk interface 106, a sound control unit 107, a display control unit 108, an operation control unit 109, a communication interface 110, a sound output unit 111, a display unit 112, an operation input unit 113, and a communication unit 114. The antenna 101 catches a radio wave transmitted in the space. The receiving unit 102 applies demodulation processing and processing such as D/A conversion to reception data supplied from the antenna 101.

For example, the recording and reproduction processing unit 103 encodes data supplied from the receiving unit 102 in accordance with the Moving Picture Expert Group-2 (MPEG-2) standard. The data encoded is supplied to the data storing unit 105 or the disk interface 106. The recording and reproduction processing unit 103 applies decoding processing and the like to data supplied from the data storing unit 105 or the disk interface 106. The data decoded is supplied to the sound control unit 107 and the display control unit 108.

The data processing unit 104 manages processing in the entire recording and reproducing apparatus 100 in this embodiment. The data storing unit 105 stores data supplied from the recording and reproduction processing unit 103, the data processing unit 104, and the like. It is assumed that, for example, a hard disk is used as the data storing unit 105. The disk interface 106 writes data subjected to predetermined processing by the recording and reproduction processing unit 103 in a disk 115. The disk interface 106 reads out data from the disk 115 and supplies the data to the recording and reproduction processing unit 103. It is assumed that the disk 115 is, for example, an optical disk such as a CD or a DVD. It is also possible to use storage media other than a disk.

The sound control unit 107 supplies supplied music data to the sound output unit 111. The music data is outputted from the sound output unit 111. The display control unit 108 supplies supplied image data to the display unit 112 constituted by, for example, a Liquid Crystal display (LCD). The image data is outputted in the display unit 112. The operation control unit 109 supplies an operation signal supplied from the operation input unit 113 to the data processing unit 104.

The communication interface 110 creates a frame from data supplied from the data processing unit 104 or the like and supplies the frame created to the communication unit 114. The communication interface 110 applies predetermined processing to the frame supplied from the communication unit 114 and supplies the frame to the data processing unit 104. The communication unit 114 performs processing for converting data supplied as an electric signal from the network into data that can be handled by the data processing unit 104. The communication unit 114 also performs processing for converting data sent from the data processing unit 104 into an electric signal and transmitting the electric signal to the network.

Figure 3:
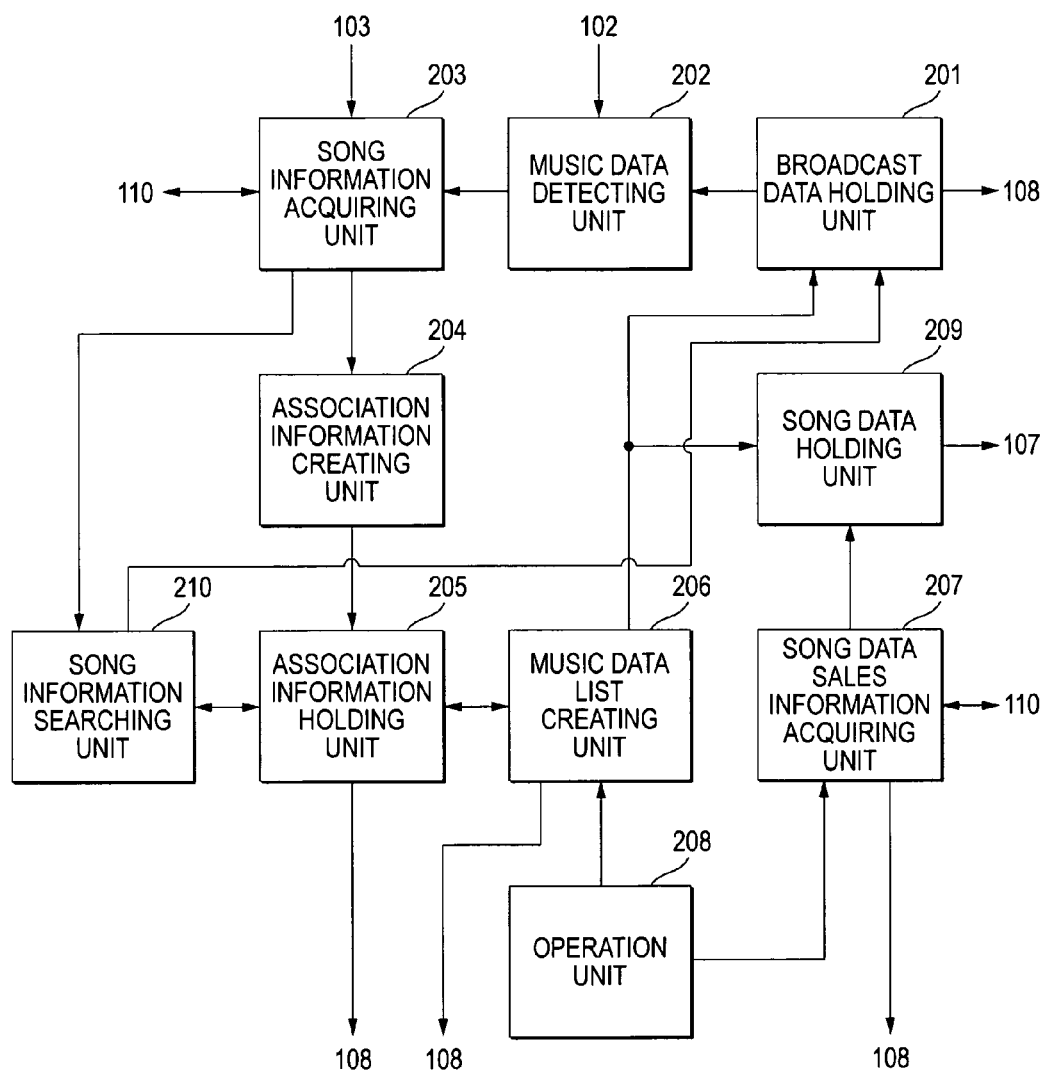
FIG. 3 is a diagram showing an example of a constitution of a reproduction function in the embodiment of the invention that reproduces song data and broadcast data on the basis of music data.

FIG. 3 is a diagram showing an example of a constitution of a reproduction function in this embodiment that reproduces song data and broadcast data on the basis of music data. It is assumed that the song data refers to data for one song corresponding to the music data. The reproduction function in this embodiment includes a broadcast data holding unit 201, a music data detecting unit 202, a song information acquiring unit 203, an association information creating unit 204, an association information holding unit 205, a music data list creating unit 206, a song data sales information acquiring unit 207, an operation unit 208, a song data holding unit 209, and a song information searching unit 210.

The broadcast data holding unit 201 holds broadcast data. It is assumed that this broadcast data is broadcast data transmitted from the broadcasting station 600 and recorded in the recording and reproducing apparatus 100 itself. The broadcast data may be broadcast data recorded in a recording medium such as an optical disk in another recording and reproducing apparatus and held by the recording and reproducing apparatus 100. The broadcast data holding unit 201 supplies the broadcast data to the display control unit 108 in response to requests from the music data list creating unit 206 and the song information searching unit 210 described later.

The music data detecting unit 202 detects a start time and an end time of music data included in broadcast data. It is assumed that music in this music data is, for example, BGM in this embodiment. The music data is explained as BGM data below. It is possible to detect the BGM data on the basis of, for example, subtitle information included in the broadcast data. When the BGM data is reproduced, a " ♪ " mark is inserted in the subtitle information, it is possible to detect a start time and an end time of the BGM data by detecting the " ♪ " mark from the subtitle information of the broadcast data.

Unlike the other data, the music data such as the BGM data has a characteristic waveform. It is also possible to detect a start time and an end time of the BGM data by detecting this characteristic waveform. The start time and the end time of the BGM data detected by the music data detecting unit 202 are supplied to the song information acquiring unit 203.

The song information acquiring unit 203 acquires song information corresponding to the BGM data at the start time of the BGM data. When a start time of BGM is supplied from the music data detecting unit 202, the song information acquiring unit 203 requests the song information holding server 800 to send song information corresponding to BGM data of the BGM. In requesting the song information, the song information acquiring unit 203 transmits, for example, waveform data of the BGM to the song information holding server 800. The song information holding server 800 searches for the song information on the basis of the waveform data of the BGM transmitted and transmits relevant song information to the song information acquiring unit 203.

In acquiring song information, a song information holding unit (not shown) having the same function as the song information holding server 800 may be provided in the recording and reproducing apparatus 100 in this embodiment instead of the song information holding server 800 to acquire the song information from the song information holding unit.

The song information acquired by the song information acquiring unit 203 is supplied to the association information creating unit 204. When song information is displayed on the display unit 112 during reception of broadcast data, the song information acquired in the song information acquiring unit 203 is directly supplied to the display control unit 108.

When the disk 115 having song data recorded therein is inserted in the disk interface 106, the song information acquiring unit 203 requests the song information holding server 800 to send song information concerning the song data and acquires the song information. In this case, as explained above, the song information acquiring unit 203 transmits waveform data of the song data to the song information holding server 800 or the song information holding unit (not shown) and acquires song information corresponding to the waveform data. The song information acquired is supplied to the song information searching unit 210.

The association information creating unit 204 creates, on the basis of broadcast data, BGM data, and song information supplied from the song information acquiring unit 203, information in which the broadcast data, the BGM data, and the song information are associated with one another (hereinafter referred to as "association information"). The association information creating unit 204 associates the BGM data, broadcast data from a start time to an end time of the BGM data, and song information of a song corresponding to the BGM data with one another. In this case, it is assumed that, for example, a BGM_ID is attached to the BGM data and a broadcast data ID is attached to the broadcast data to associate the BGM data and the broadcast data with each other according to the Identifications (IDs). The broadcast data ID may be attached to each broadcast data including one BGM data or may be attached to each episode of a broadcast program. Alternatively, the broadcast data ID may be attached in other units.

The association information created by the association information creating unit 204 is supplied to the association information holding unit 205. The association information holding unit 205 holds the association information supplied from the association information creating unit 204.

The music data list creating unit 206 creates a list of BGM data on the basis of the association information held by the association information holding unit 205. It is assumed that this list of BGM data is a list based on titles and artist names of songs. The list of BGM data may be a list obtained by classifying the BGM data on the basis of moods of songs. Specifically, the list of BGM data is a list of songs based on sensibility recognition such as a "healing song" and a "sad song". The list based on sensibility recognition is created on the basis of an element such as a magnitude of amplification of a waveform of BGM data. The list of BGM data may be classified on the basis of television program names and formed as a list of titles and artists of songs corresponding to BGM data corresponding to the television programs.

The list of BGM data is supplied to the display control unit 108 and displayed on the display unit 112. When specific BGM data is selected from the list of BGM data in the operation unit 208, the music data list creating unit 206 requests the song data holding unit 209 to output song data corresponding to the selected BGM data to the sound control unit 107. The music data list creating unit 206 requests the broadcast data holding unit 201 to output broadcast data corresponding to the selected BGM data to the display control unit 108. In the case in which the list of BGM data is classified on the basis of television program names, when a television program name is selected, song data corresponding to the BGM data in the television program are outputted in order.

The song data sales information acquiring unit 207 acquires sales information of commodities related to a song corresponding to BGM data (hereinafter referred to as "song data sales information"). The commodities related to a song corresponding to BGM data refer to, for example, MPEG Audio Layer-3 (MP3) data or a single CD of song data, an album CD in which the song data is inserted, and incoming call music of a cellular phone. The sales information of commodities related to song data refers to, for example, sales prices and stock states of commodities related to the song data. The operation unit 208 causes a user to select the commodities related to the song data corresponding to a request of the user. The operation unit 208 may be a remote controller type unit or may be a voice type unit sensitive to a voice of the user.

It is possible to acquire this song data sales information by requesting, through the network 700, a dedicated server holding the song data sales information to send the song data sales information. The song data sales information acquired is supplied to the display control unit 108 and displayed on the display unit 112. When the user selects a commodity that should be purchased on the operation unit 208, it is possible to purchase the commodity selected. When the commodity purchased is downloadable through the network, downloadable data of the commodity is held by the song data holding unit 209.

The song data holding unit 209 holds song data. It is assumed that the song data held by the song data holding unit 209 is, for example, downloadable song data purchased through song sales information acquired by the song data sales information acquiring unit 207 and song data transferred from a recording medium having the song data stored therein. In response to a request from the music data list creating unit 206, the song data holding unit 209 supplies song data corresponding to the request to the sound control unit 107. The song data is outputted from the sound output unit 111.

The song information searching unit 210 searches through the association information holding unit 205 to find song information identical with song information of the song data included in the disk 115. The song information of the song data included in the disk 115 is acquired by the song information acquiring unit 203 as described above. As a result of the search, when the identical song information is found, the song information searching unit 210 requests the broadcast data holding unit 201 to output broadcast data corresponding to the song information to the display control unit 108. When plural pieces of song information identical with the song information of the song data included in the disk 115 are found, the song information searching unit 210 requests the broadcast data holding unit 201 to output plural broadcast data corresponding to the song information to the display control unit 108. In this case, the broadcast data holding unit 201 appropriately connects and outputs the plural broadcast data requested.

The broadcast data holding unit 201, the association information holding unit 205, and the song data holding unit 209 are realizable mainly by the data storing unit 105. The music data detecting unit 202, the song information acquiring unit 203, the association information creating unit 204, the music data list creating unit 206, the song data sales information acquiring unit 207, and the song information searching unit 210 are realizable mainly by the data processing unit 104. The operation unit 208 is realizable by the operation control unit 109 and the operation input unit 113.

Figure 4:
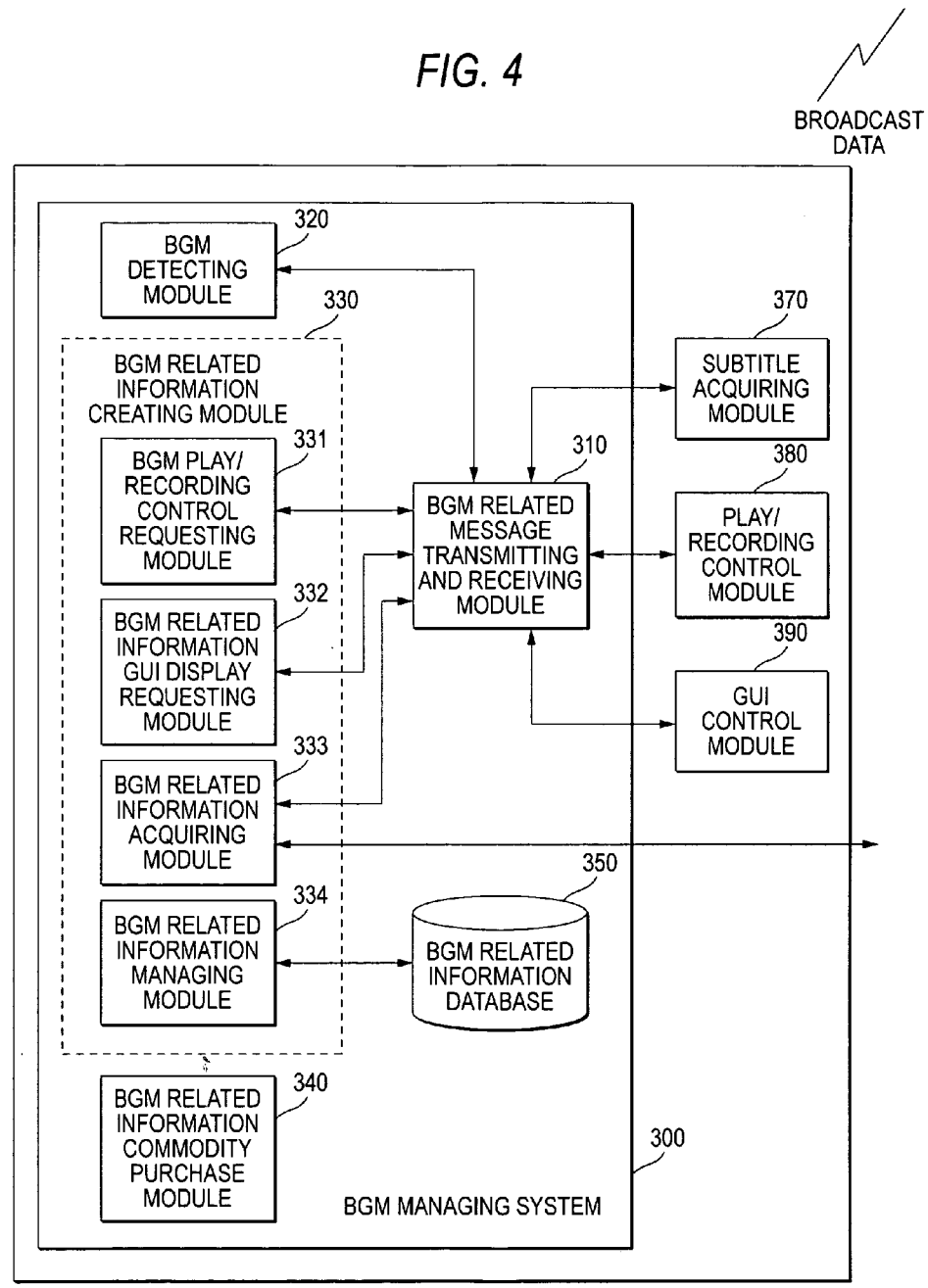
FIG. 4 is a diagram showing an example of a software configuration of the recording and reproducing apparatus 100 in the embodiment of the invention.

FIG. 4 is a diagram showing an example of a software configuration of the recording and reproducing apparatus 100 in this embodiment. As in FIG. 3, in the explanation of FIG. 4, it is assumed that music data is BGM data.

This example of the software configuration includes a BGM managing system 300, a subtitle acquiring module 370, a reproduction/recording control module 380, and a Graphical User Interface (GUI) control module 390. The BGM managing system 300, the subtitle acquiring module 370, the reproduction/recording control module 380, and the GUI control module 390 are realized mainly in the data processing unit 104. A BGM related information database 350 in the BGM managing system is realized in the data storing unit 105.

The subtitle acquiring module 370 acquires subtitle information included in broadcast data. In this embodiment, necessary subtitle information is a " ♪ " mark that is inserted when BGM data is reproduced. The reproduction/recording control module 380 performs processing concerning reproduction and recording of song data, broadcast data, and the like. For example, the reproduction/recording control module 380 manages information on broadcast data and song data and performs processing concerning recording and reproduction of data such as the broadcast data and the song data in response to a request. The GUI control module 390 performs processing concerning display on the display unit 112.

The BGM managing system 300 is a system that manages information in which BGM data, song data, and broadcast data are associated with one another. The BGM managing system 300 includes a BGM related message transmitting and receiving module 310, a BGM detecting module 320, a BGM related information creating module 330, a BGM related information commodity purchase module 340, and a BGM related information database 350.

The BGM related message transmitting and receiving module 310 performs processing concerning transmission and reception of messages among the BGM detecting module 320, the BGM related information creating module 330, the BGM related information commodity purchase module 340, the subtitle acquiring module 370, the reproduction/recording control module 380, and the GUI control module 390. The respective modules exchange messages via the BGM related message transmitting and receiving module 310.

The BGM detecting module 320 detects a start time and an end time of BGM data. As described above, when the BGM data is reproduced, a " ♪ " mark is inserted in subtitle information. A start time and an end time of BGM data are detected by the BGM detecting module 320 on the basis of subtitle information acquired by the subtitle acquiring module 370. The BGM related information commodity purchase module 340 performs purchase processing for commodities concerning BGM data. Specifically, the BGM related information commodity purchase module 340 performs purchase processing for song data and the like in response to a request from a user based on song data sales information.

The BGM related information creating module 330 includes a BGM reproduction/recording control requesting module 331, a BGM related information GUI display requesting module 332, a BGM related information acquiring module 333, and a BGM related information managing module 334. The BGM reproduction/recording control requesting module 331 requests information concerning broadcast data corresponding to BGM data, broadcast data that should be reproduced, and the like. The BGM related information GUI display requesting module 332 requests display or non-display of song information corresponding to BGM data.

The BGM related information acquiring module 333 performs acquisition processing for song information, acquisition processing for song data sales information, and the like corresponding to BGM data. The BGM related information managing module 334 manages acquired song information, information on broadcast data, information on BGM data, and the like. Specifically, the BGM related information acquiring module 333 stores information that should be managed such as acquired song information, information on broadcast data, and information on BGM data in the BGM related information database 350 and, for example, outputs requested information with reference to the BGM related information database 350 in response to a request. The BGM related information database 350 holds the acquired song information, information on broadcast data, and information on BGM data in association with one another as described above.

FIG. 5 is a table showing an example of a constitution of the BGM related information database 350. The BGM related information database 350 includes a BGM_ID 351, a broadcast data ID 352, a BGM title 353, a BGM artist 354, a genre A 355, a genre B 356, a BGM location 357, a broadcast program name 358, a start time code 359, and an end time code 360.

The BGM_ID 351 is an ID for uniquely identifying BGM data included in broadcast data one by one. Plural BGM data including an identical title and an identical artist may be present. Even in this case, the BGM data have different BGM_IDs 351 if scenes in which the BGM data are used in the broadcast data are different. In FIG. 5, the BGM_ID 351 is represented by "001", "002", and "003". The broadcast data ID 352 is, for example, an ID for uniquely identifying broadcast data including one of the plural BGM data one by one. As described above, a broadcast data ID may be attached to BGM data every time the BGM data is recorded or may be attached in other units. Thus, content of broadcast data corresponding to the broadcast data ID 352 changes according to how the broadcast data ID 352 is attached. In FIG. 5, the broadcast data ID 352 is represented by "001", "002", and "003".

The BGM title 353 is a title of a song corresponding to BGM data. The BGM artist 354 is an artist name of the song corresponding to the BGM data. The genre A 355 is, for example, a genre grasped in terms of a musical tone of the song corresponding to the BGM data. In FIG. 5, the genre A 355 is represented as "pops". There are other genres such as "rock" and "classical music". The genre B 356 is, for example, a genre grasped in terms of sensibility recognition of the song corresponding to the BGM data. In FIG. 5, the genre B 356 is represented as "healing song" and "sad song". There are other genres such as "merry song".

The BGM location 357 indicates a physical location of song data corresponding to the BGM data. In the case of "in apparatus", the BGM location 357 indicates that the song data corresponding to the BGM data is held by the recording and reproducing apparatus 100 itself that holds the BGM related information database 350. In the case of "PC1" and "PC2", the BGM location 357 indicates that the song data corresponding to the BGM data is held by external apparatuses represented by "PC1" and "PC2" rather than being held by the recording and reproducing apparatus 100 itself that holds the BGM related information database 350.

The broadcast program name 358 indicates a program name of a program in which the BGM data is used. The start time code 359 indicates time of the broadcast data when the BGM data starts. In other words, the start time code 359 indicates time from the beginning of the broadcast data corresponding to the broadcast data ID until the start of the BGM data. The end time code 360 indicates time of the broadcast data when the BGM data ends. In other words, the end time code 360 indicates time from the beginning of the broadcast data corresponding to the broadcast data ID until the end of the BGM data. (The start time code 359 and the end time code 360 will be hereinafter generally referred to as "time code".)

FIGS. 6A and 6B are tables showing formats of messages and types of message IDs used in the embodiment of the invention. FIG. 6A is a table showing formats of messages. A message format 400 includes a header section including a message ID 401, a sequence number 402, a response flag 403, and a payload length 404 and a payload 405.

The message ID 401 indicates a type of a message used in internal communication in the recording and reproducing apparatus 100 in this embodiment. The sequence number 402 is a number for uniquely identifying the message. The response flag 403 indicates information on a response in the message. In the case of "0", the response flag 403 indicates that the message for which a response is not necessary. In the case of "1", the response flag 403 indicates that the message for which a response is necessary. In the case of "2", the response flag 403 indicates that the message is a message responding to the message for which a response is necessary.

The payload length 404 indicates a volume of data included in a payload. In FIG. 6A, the payload length 404 is indicated as "10", "15", and "20". A unit of the payload length 404 is "byte". The payload is a section that includes a data body excluding the header section.

FIG. 6B is a table in which examples of types of the messages with the message ID 401 in FIG. 6A are listed. A message ID "001" indicates a BGM detection message. Specifically, the message ID "001" indicates a message concerning detection of BGM data sent from the BGM detecting module 320 shown in FIG. 4. A message ID "002" indicates a BGM recording control message. Specifically, the message ID "002" indicates a message for requesting information on broadcast data sent from the BGM reproduction/recording control requesting module 331 shown in FIG. 4.

A message ID "003" indicates a BGM recording control response message. Specifically, the message ID "003" indicates a message that should be received as a response to the message with the message ID "002" in the BGM reproduction/recording control requesting module 331 shown in FIG. 4. A message ID "004" indicates a BGM reproduction control message. Specifically, the message ID "004" indicates a message indicating information on broadcast data corresponding to BGM data, which should be reproduced, sent from the BGM reproduction/recording control requesting module 331 shown in FIG. 4.

A message ID "005" indicates a BGM related information acquisition message. Specifically, the message ID "005" indicates a message for requesting song information, song data sales information, and the like corresponding to BGM data sent from the BGM related information acquiring module 333 shown in FIG. 4. A message ID "006" indicates a BGM related information acquisition response message. Specifically, the message ID "006" indicates a message that should be received as a response to the message with the message ID "005" in the BGM related information acquiring module 333 shown in FIG. 4. A message ID "007" indicates a BGM display control message. Specifically, the message ID "007" indicates a message concerning display of song information corresponding to BGM data sent from the BGM related information GUI display requesting module 332 shown in FIG. 4.

A message ID "008" indicates a BGM related commodity purchase message. Specifically, the message ID "008" indicates a message concerning purchase of commodities sent from the BGM related information commodity purchase module 340 shown in FIG. 4. A message ID "009" indicates a BGM related commodity purchase response message. Specifically, the message ID "009" indicates a message that should be received as a response to the message with the message ID "008" in the BGM related information commodity purchase module 340 shown in FIG. 4.

FIGS. 7A to 7C are tables showing contents of the messages with the message IDs "001" to "003". FIG. 7A is a table showing content of the message with the message ID "001". In the case of the message ID "001", the message is a message for informing that BGM data is detected. Thus, a response flag is "0" because a response is not specifically necessary. A BGM detection status is data inserted in the payload 405. When the BGM detection status is "1", the BGM detection status indicates that a start time of the BGM data is detected. When the BGM detection status is "0", the BGM detection status indicates that an end time of the BGM data is detected. Since it is possible to indicate the BGM detection status with "1" or "0", a payload length is 1 bit.

FIG. 7B is a table showing content of the message with the message ID "002". In the case of the message ID "002", the message is a message for requesting information on broadcast data. The response flag is "1" because a response to the message is necessary. A command number is data inserted in the payload 405. The command number is set to "1" when a broadcast data ID and a time code are requested. Since it is possible to indicate the command number with "1" or "0", the payload length is 1 bit.

FIG. 7C is a table showing content of the message with the message ID "003". In the case of the message ID "003", the message is a response message corresponding to the message with the message ID "002". In other words, the message is a response message corresponding to the broadcast ID and the time code requested in the message with the message ID "002". The broadcast data ID and the time code are inserted in the payload 405. For example, the start time code and the end time code explained in FIG. 5 correspond to the time code.

FIGS. 8A to 8C are tables showing contents of the messages with the message IDs "004" to "006". FIG. 8A is a table showing content of the message with the message ID "004". In the case of the message ID "004", the message is a message for communicating information on broadcast data corresponding to BGM data that should be reproduced. In this case, when the message is a request for reproducing the BGM, a command number is set to "1". When the message is a request for stopping reproduction, the command number is set to "0". As other kinds of information, a BGM_ID for specifying song data that should be reproduced, a broadcast data ID for specifying broadcast data that should be reproduced, and a time code for specifying a start time and an end time of BGM data in the broadcast data specified by the broadcast data ID are inserted.

FIG. 8B is a table showing content of the message with the message ID "005". The message with the message ID "005" is a message for requesting song information, song data sales information, and the like corresponding to BGM data sent from the BGM related information acquiring module 333 as described above. When a command number in the payload 405 is "0", the message is a message for requesting song information corresponding to a song specified by a BGM_ID. When the command number is "1", the message is a message for requesting song data sales information corresponding to the song specified by the BGM_ID.

FIG. 8C is a table showing content of the message with the message ID "006". The message with the message ID "006" is a message that should be received as a response to the message with the message ID "005" in the BGM related information acquiring module 333 as described above. The song information or the song data sales information corresponding to the BGM_ID requested in the message with the message ID "005" is inserted in "display information" in the payload 405.

FIGS. 9A to 9C are tables showing contents of the messages with the message IDs "007" to "009". FIG. 9A is a table showing content of the message with the message ID "007". The message with the message ID "007" is a message concerning display of song information corresponding to BGM data sent from the BGM related information GUI display requesting module 332 as described above. When a command number in the payload 405 is "1", the command number represents a request for displaying song information corresponding to a song specified by a BGM_ID. Content of this song information is inserted in "display information". On the other hand, when the command number in the payload 405 is "0", the command number represents a request for making information displayed on the display unit 112 non-display.

FIG. 9B is a table showing content of the message with the message ID "008". The message with the message ID "008" is a message for requesting purchase of commodities sent from the BGM related information commodity purchase module 340. A commodity ID in the payload 405 is an ID for specifying a commodity in song data sales information. A storage destination number specifies, when the commodity specified by the commodity ID is a downloadable commodity, a download destination of the commodity. In FIG. 9B, the storage destination number "1" indicates, for example, the recording and reproducing apparatus 100 itself that sends the message and the storage destination number "2" indicates other apparatuses and the like constituting the network.

FIG. 9C is a table showing content of the message with the message ID "009". The message with the message ID "009" is a message that should be received as a response to the message ID "008" in the BGM related information commodity purchase module 340 as described above. A "result" in the payload 405 is set with whether the purchase of the commodity requested by the message with the message ID "008" is successful. In FIG. 9C, for example, when the "result" is "1", this indicates that the purchase of the commodity is successful. When the "result" is "0", this indicates that the purchase of the commodity is unsuccessful.

Figure 10:
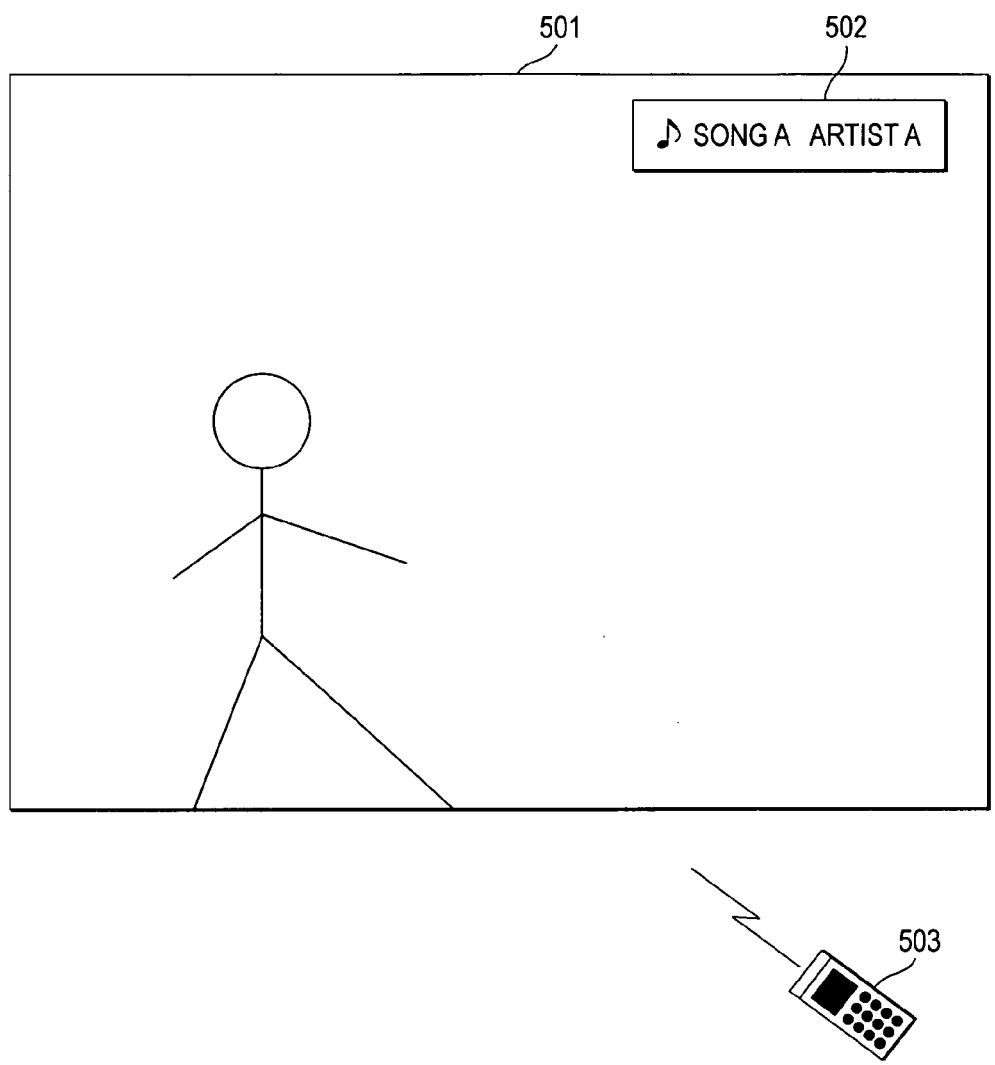
FIG. 10 is a diagram showing an example of a display screen on which a title and an artist name of a song corresponding to BGM data are displayed in the recording and reproducing apparatus 100 in the embodiment of the invention.

FIG. 10 is a diagram showing an example of a display screen on which a title and an artist name of a song corresponding to BGM data are displayed in the recording and reproducing apparatus 100 in this embodiment. When BGM data is reproduced while recorded broadcast data is reproduced in the recording and reproducing apparatus 100 in this embodiment, song information 502 corresponding to the BGM data is displayed at the upper right in a display screen 501. In FIG. 10, a title and an artist name of a song in song information are displayed.

When BGM data of the song information 502 is detected in broadcast data, the recording and reproducing apparatus 100 transmits waveform data of the BGM data to the song information holding server 800. The song information holding server 800 transmits, on the basis of the waveform data, song information corresponding to the BGM data to the recording and reproducing apparatus 100 in this embodiment. The song information transmitted from the song information holding server 800 is displayed on the display screen 501. A title and an artist name of a song corresponding to BGM data may be acquired from a not-shown song information holding unit held by the recording and reproducing apparatus 100 itself and displayed instead of acquiring the title and the artist name from the song information holding server 800.

The song information 502 may be acquired and displayed through the same processing when broadcast data received from the broadcasting station 600 is displayed on the display screen instead of the recorded broadcast data.

The song information transmitted from the song information holding server 800 is held by the recording and reproducing apparatus 100. In reproducing the same broadcast data next time, the recording and reproducing apparatus 100 displays the song information held by the recording and reproducing apparatus 100 itself on the display screen 501 instead of acquiring song information from the song information holding server 800. The user performs processing for displaying the song information 502 on the display screen 501 with, for example, a remote controller 503.

FIG. 11 is a diagram showing an example of the display screen on which a title and an artist name of a song corresponding to BGM data and detailed information concerning the song are displayed in the recording and reproducing apparatus 100 in this embodiment. Song information 511 including a title and an artist name of a song and detailed information concerning the song is displayed on the display screen 501. The detailed information concerning the song is, for example, information on the song such as a title of a movie in which the song is used and the number of songs including the song created by the artist. When the user selects artist details 512 displayed on the display screen 501 with, for example, the remote controller 503, detailed information of the artist is displayed.

When the user selects a purchase mark 513 displayed on the display screen 501 with, for example, the remote controller 503, song data sales information is displayed on the display screen 501. When the user selects "close", the song information 511 disappears from the display screen 501.

Figure 12:
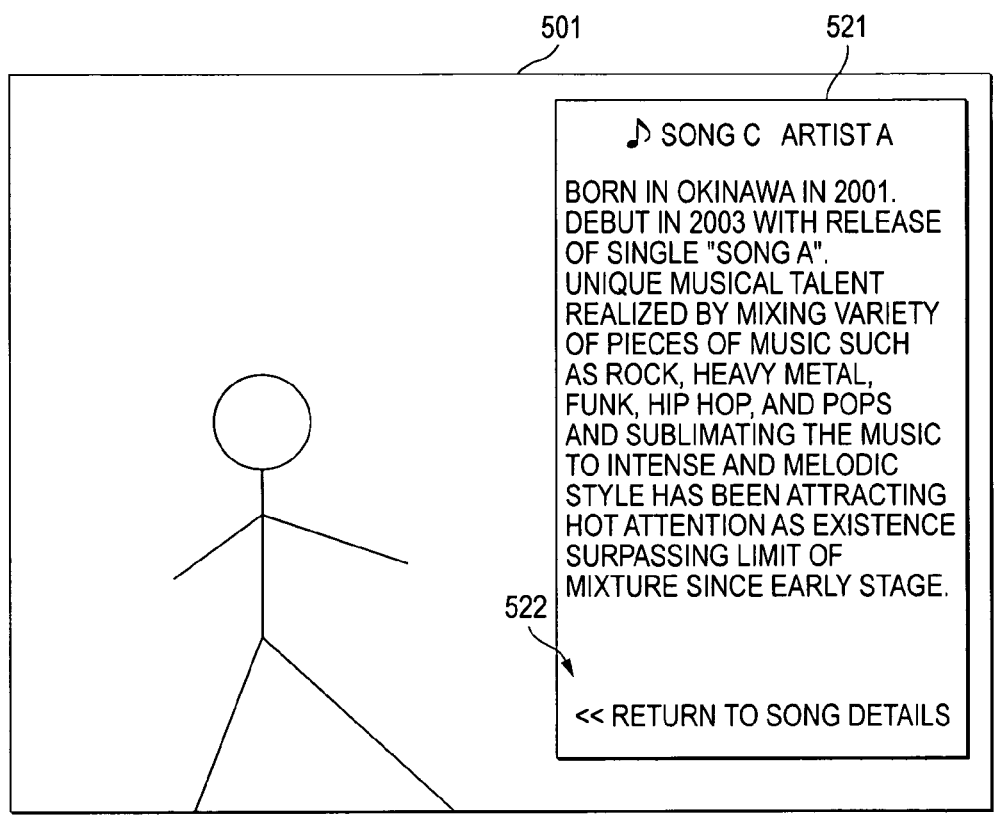
FIG. 12 is a diagram showing an example of the display screen on which a title and an artist name of a song corresponding to BGM data and detailed information concerning the artist are displayed in the recording and reproducing apparatus 100 in the embodiment of the invention.

FIG. 12 is a diagram showing an example of the display screen on which a title and an artist name of a song corresponding to BGM data and detailed information concerning the artist are displayed in the recording and reproducing apparatus 100 in this embodiment. Song information 521 including a title and an artist name of a song and detailed information concerning the artist is displayed on the display screen 501. The detailed information concerning the artist is, for example, information on a place of birth, a history until the debut, characteristics, and the like of the artist. When the user selects song details 522 displayed on the display screen 501 with, for example, the remote controller 503, detailed information of the song is displayed.

FIG. 13 is a diagram showing an example of the display screen on which song data sales information concerning a song corresponding to BGM data is displayed in the recording and reproducing apparatus 100 in this embodiment. Song data sales information 531 is displayed on the display screen 501. The song data sales information 531 includes song information 532 including a title and an artist name of a song, a check box 533, a type 534, a title 535, a price 536, details 537, a purchase mark 538, and a "close" mark 539.

In the case in which a commodity that the user desires to purchase is present in the song data sales information 531, when the user checks the checkbox 533, a check mark is displayed. The type 534 is information indicating a type of a commodity such as an MP3, a single CD, an album CD, a musical score, or incoming call music. The title 535 is information indicating a title of the commodity. The price 536 is information indicating a price of the commodity. When the user selects the details 537, detailed information of a song or detailed information of an artist corresponding to the commodity is displayed.

When the user checks the check box 533 of a commodity that the user desires to purchase and selects the purchase mark 538, the user enters a purchase procedure. When the user selects the "close" mark 539, the song data sales information 531 disappears from the display screen 501.

Figure 14:
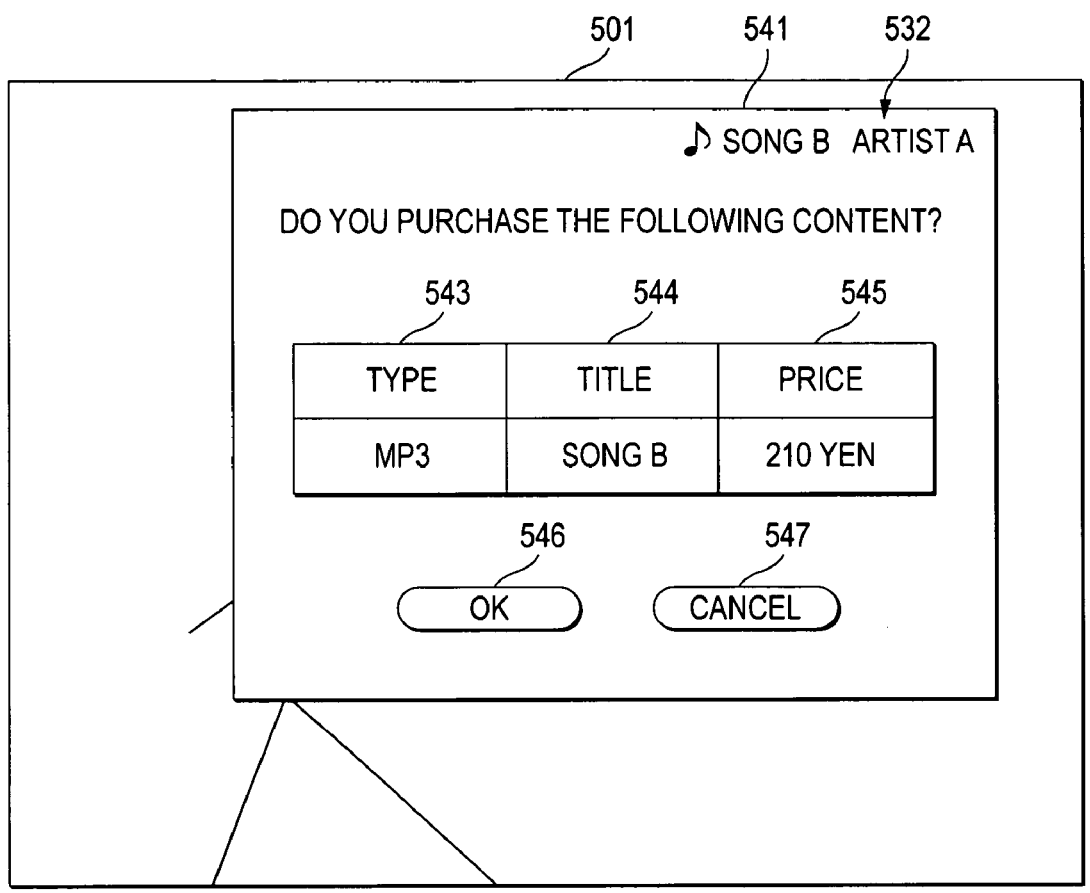
FIG. 14 is a diagram showing an example of the display screen after a purchase mark 538 is selected in the recording and reproducing apparatus 100 in the embodiment of the invention.

FIG. 14 is a diagram showing an example of the display screen after the purchase mark 538 is selected in the recording and reproducing apparatus 100 in this embodiment. When the user checks the check box 533 corresponding to a commodity, which the user desires to purchase, and selects the purchase mark 538 in FIG. 13, a purchase confirmation indication 541 is displayed on the display screen 501. The purchase confirmation indication 541 includes song information 542 including a title and an artist name of a song, a type 543, a title 544, a price 545, an "OK" mark 546, and a "cancel" mark 547.

The recording and reproducing apparatus 100 causes the user to confirm the song information 542 including a title and an artist name of a song, the type 543, the title 544, and the price 545 in the purchase confirmation indication 541. When the user finds no problem in this information, the recording and reproducing apparatus 100 causes the user to select the "OK" mark 546 and purchase procedure processing is performed. When the user finds a problem in the information in the purchase confirmation indication 541, the recording and reproducing apparatus 100 causes the user to select the "cancel" mark 547 to suspend the purchase procedure processing.

FIG. 15 is a diagram showing an example of the display screen on which a BGM data list of information concerning accumulated BGM data is displayed in the recording and reproducing apparatus 100 in this embodiment. When the user selects display of the BGM data list with the remote controller 503, a BGM data list indication 551 is displayed on the display screen 501. The BGM data list indication 551 includes a title 552, an artist 553, time 554, details 555, a "play" mark 556, and a "close" mark 557.

Information displayed in the BGM data list indication 551 is information on BGM data accumulated in the recording and reproducing apparatus 100 in this embodiment. The user selects BGM data, which the user desires to reproduce, looking at the BGM data list indication 551. After the selection, when the user selects the "play" mark 556, song data and broadcast data corresponding to the BGM data selected are reproduced. When the user selects the "close" mark 557, the BGM data list indication 551 disappears from the display screen 501.

Operations of the recording and reproducing apparatus 100 in this embodiment will be explained with reference to the drawings.

Figure 16:
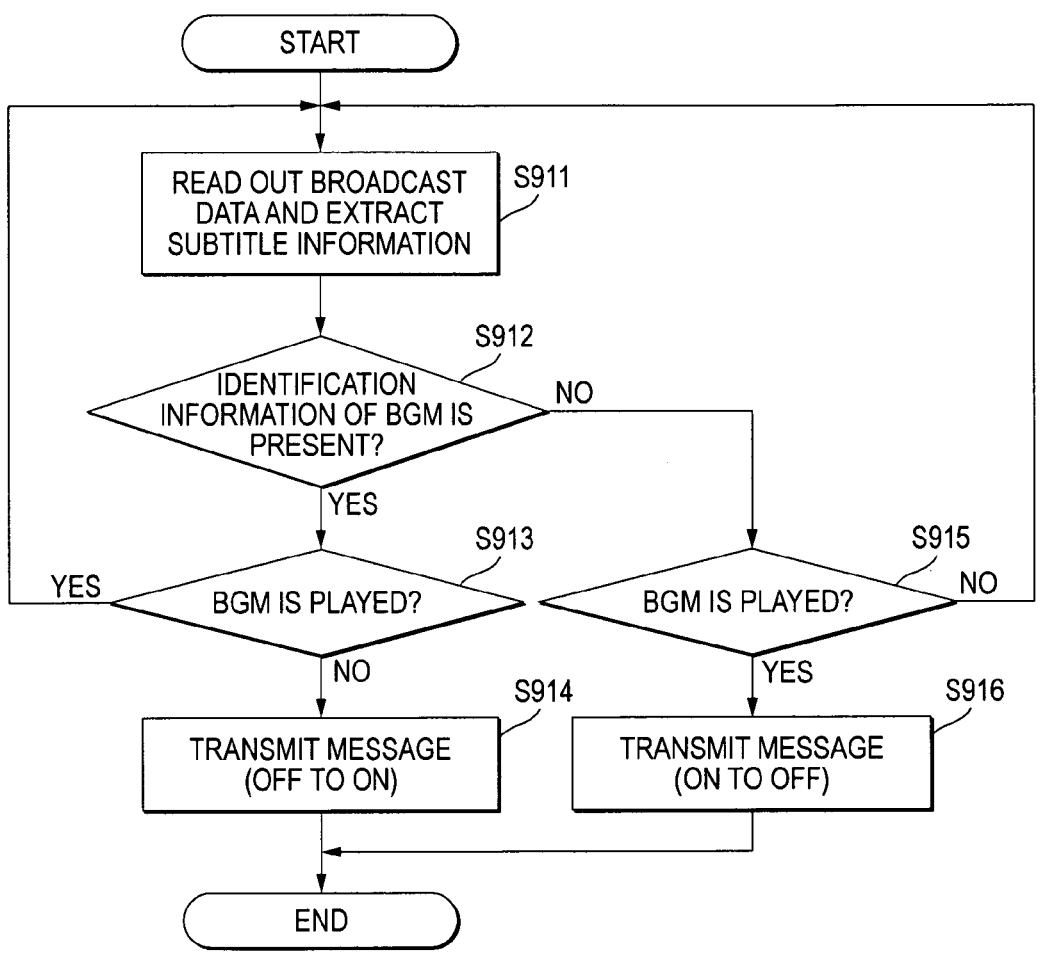
FIG. 16 is a flowchart of a flow of processing in a BGM detecting module in the embodiment of the invention.

FIG. 16 is a flowchart of a flow of processing in the BGM detecting module 320. The BGM detecting module 320 reads out broadcast data from a recording medium and extracts subtitle information included in the broadcast data in the subtitle acquiring module 370 (S911). The broadcast data may be broadcast data received from the broadcasting station 600. The BGM detecting module 320 judges whether information for identifying BGM data (e.g., a " ♪" mark) is present in the subtitle information extracted (S912).

When it is judged that the information for identifying BGM data is present, the BGM detecting module 320 detects BGM data and judges whether BGM is played (S913). When it is judged that the BGM is not played, the BGM detecting module 320 transmits information indicating that the play of the BGM begins immediately after the judgment (OFF to ON) to the BGM related information creating module 330 (S914). On the other hand, when it is judged that the BGM is played, the BGM detecting module 320 returns to step S911.

After the information for identifying BGM data is detected, there is a slight time lag until BGM is actually played. Start timing of the BGM is detected using the time lag.

When it is judged that information for identifying BGM is not present, the BGM detecting module 320 detects BGM data and judges whether BGM is played (S915). When it is judged that the BGM is played, the BGM detecting module 320 transmits information indicating that the play of the BGM data ends immediately after the judgment (On to OFF) to the BGM related information creating module 330 (S916). On the other hand, when it is judged that the BGM is not played, the BGM detecting module 320 repeats the processing from step S911.

When the BGM related information creating module 330 receives information indicating that that the play of the BGM ends after a predetermined time (ON to OFF) as described later, the BGM related information creating module 330 makes the song information non-display. After the information for identifying the BGM data is detected in subtitle information, the BGM is played for the predetermined time. However, after the predetermined time, the play of the BGM stops. It is necessary to make the song information non-display after the play of the BGM ends. In order to inform that the song information should be made non-display after the predetermined time, the BGM detecting module 320 performs steps S915 and S916.

Figure 17:
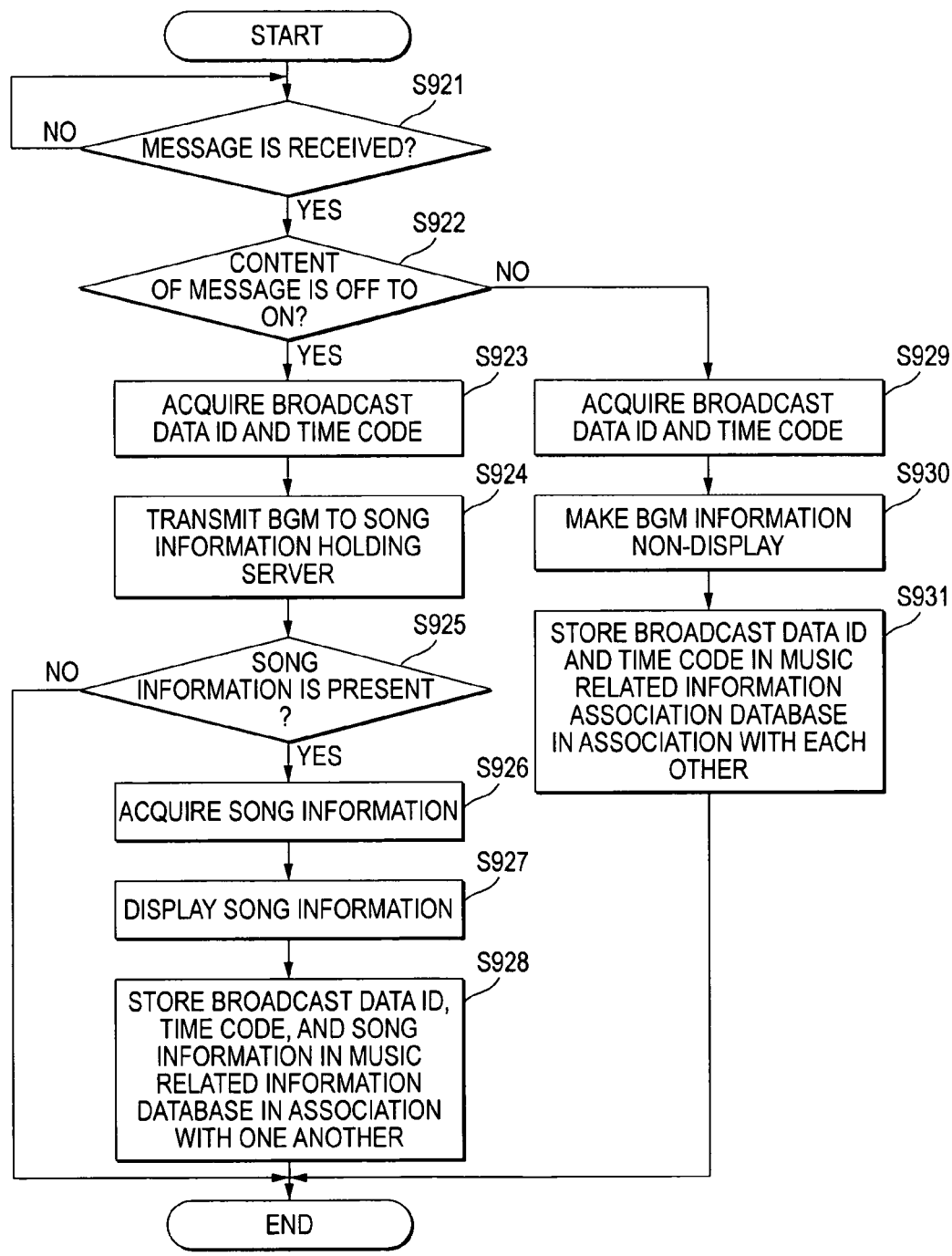
FIG. 17 is a flowchart of a flow of processing in a BGM related information creating module 330 in the embodiment of the invention.

FIG. 17 is a flowchart of a flow of processing in the BGM related information creating module 330. When the BGM related information creating module 330 receives a message from the BGM detecting module 320 (S921), the BGM related information creating module 330 judges content of the message (S922). When the content of the message is information indicating that the play of BGM begins (OFF to ON), the BGM reproduction/recording control requesting module 331 requests a broadcast data ID and a time code and acquires the broadcast data ID and the time code (S923).

The BGM related information acquiring module 333 transmits waveform data of BGM data to the song information holding server 800 (S924). Consequently, the song information holding server 800 judges whether there is song information corresponding to the waveform data of the BGM data transmitted (S925). When the song information is present, the BGM related information acquiring module 333 acquires the song information (S926). The BGM related information GUI display requesting module 332 displays the song information acquired in step S926 (S927). The BGM related information managing module 334 stores the information acquired in step S923 and the information acquired in step S926 in the BGM related information database 350 in association with each other (S928).

When the content of the message is information indicating that the play of the BGM ends after a predetermined time (ON to OFF), the BGM reproduction/recording control requesting module 331 requests a broadcast data ID and a time code and acquires the broadcast data ID and the time code (S929). The BGM related information GUI display requesting module 332 makes the song information on the display screen non-display (S930). The BGM related information managing module 334 stores the pieces of information acquired in step S929 in the BGM related information database 350 in association with each other (S931).

Figure 18:
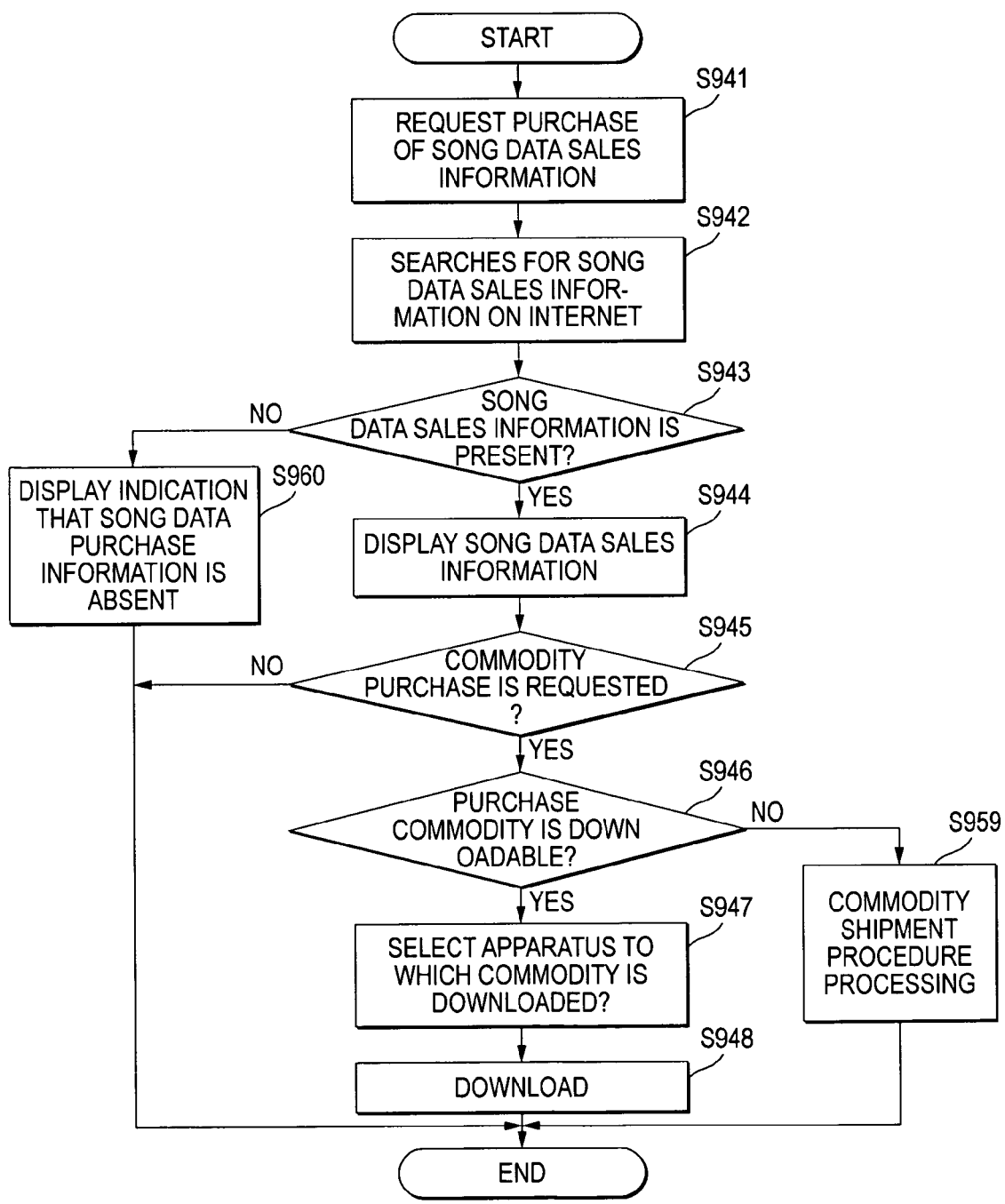
FIG. 18 is a flowchart of a flow of processing in a BGM related information commodity purchase module 340 in the embodiment of the invention.

FIG. 18 is a flowchart of a flow of processing in the BGM related information commodity purchase module 340 in this embodiment. When a request concerning song data sales information corresponding to a certain BGM data song is received (S941), the BGM related information commodity purchase module 340 sends a message to the BGM related information acquiring module 333 to instruct the BGM related information acquiring module 333 to search for song data sales information on the Internet (S942) When song data sales information is not found, the BGM related information commodity purchase module 340 sends a message to the BGM related information GUI display requesting module 332 to instruct the BGM related information GUI display requesting module 332 to display an indication that song data sales information is not present (S960).

On the other hand, when song data sales information is found, the BGM related information commodity purchase module 340 sends a message to the BGM related information GUI display requesting module 332 to instruct the BGM related information GUI display requesting module 332 to display the song data sales information (S944). When a request for purchasing a commodity in the song data sales information displayed is received (S955), the BGM related information commodity purchase module 340 judges whether the commodity is downloadable (S956).

When the commodity is downloadable, the BGM related information commodity purchase module 340 causes the user to select an apparatus to which the commodity is downloaded (S957). When the user selects an apparatus, the BGM related information commodity purchase module 340 downloads the commodity to the apparatus selected (S958). On the other hand, when the commodity is not downloadable, the BGM related information commodity purchase module 340 causes the user to take a commodity shipment procedure (S959).

Figure 19:
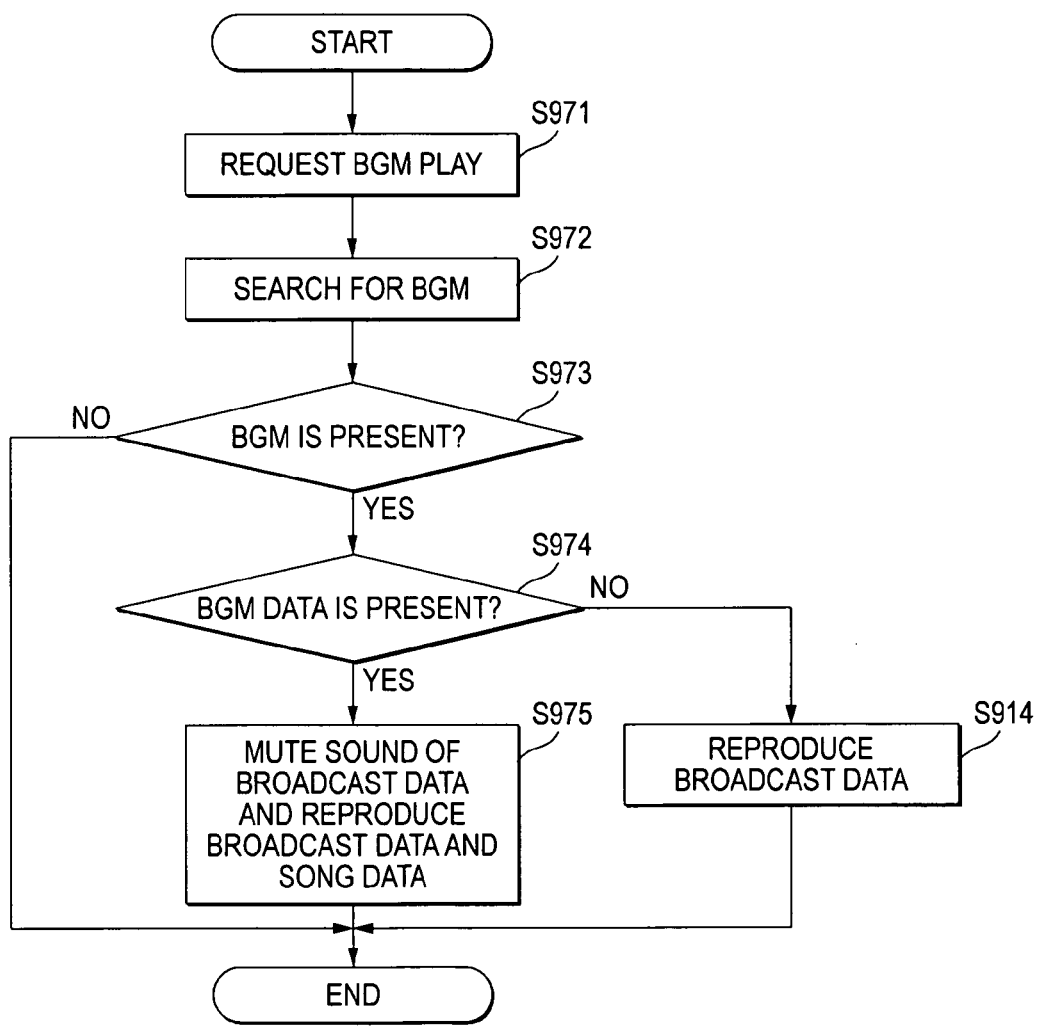
FIG. 19 is a flowchart of a flow of processing for reproducing song data and broadcast data corresponding to BGM data in the embodiment of the invention.

FIG. 19 is a flowchart of a flow of processing for reproducing song data and broadcast data corresponding to BGM data.

When a request for BGM data that should be reproduced is received (S971), the BGM related information managing module 334 searches through the BGM related information database 350 to find the BGM data requested (S972). As a result of the search, when it is judged that the BGM data requested is not present, the processing ends (S976).

As a result of the search, when it is judged that the BGM data requested is present, the BGM related information managing module 334 judges whether there is song data corresponding to the BGM data (S974). Since the BGM location is held in the BGM related information database 350, it is possible to perform such judgment.

When it is judged that song data corresponding to the BGM data is not present, the BGM reproduction/recording control requesting module 331 requests the reproduction/recording control module 380 to reproduce broadcast data corresponding to the BGM data. In response to this request, the reproduction/recording control module 380 reproduces the broadcast data corresponding to the BGM data.

When it is judged that song data corresponding to the BGM data is present, the BGM reproduction/recording control requesting module 331 requests the reproduction/recording control module 380 to reproduce the song data and the broadcast data corresponding to the BGM data. In this case, the reproduction/recording control module 380 performs mute processing (silencing processing) not to reproduce sound data included in the broadcast data and reproduces the broadcast data (S975).

Figure 20:
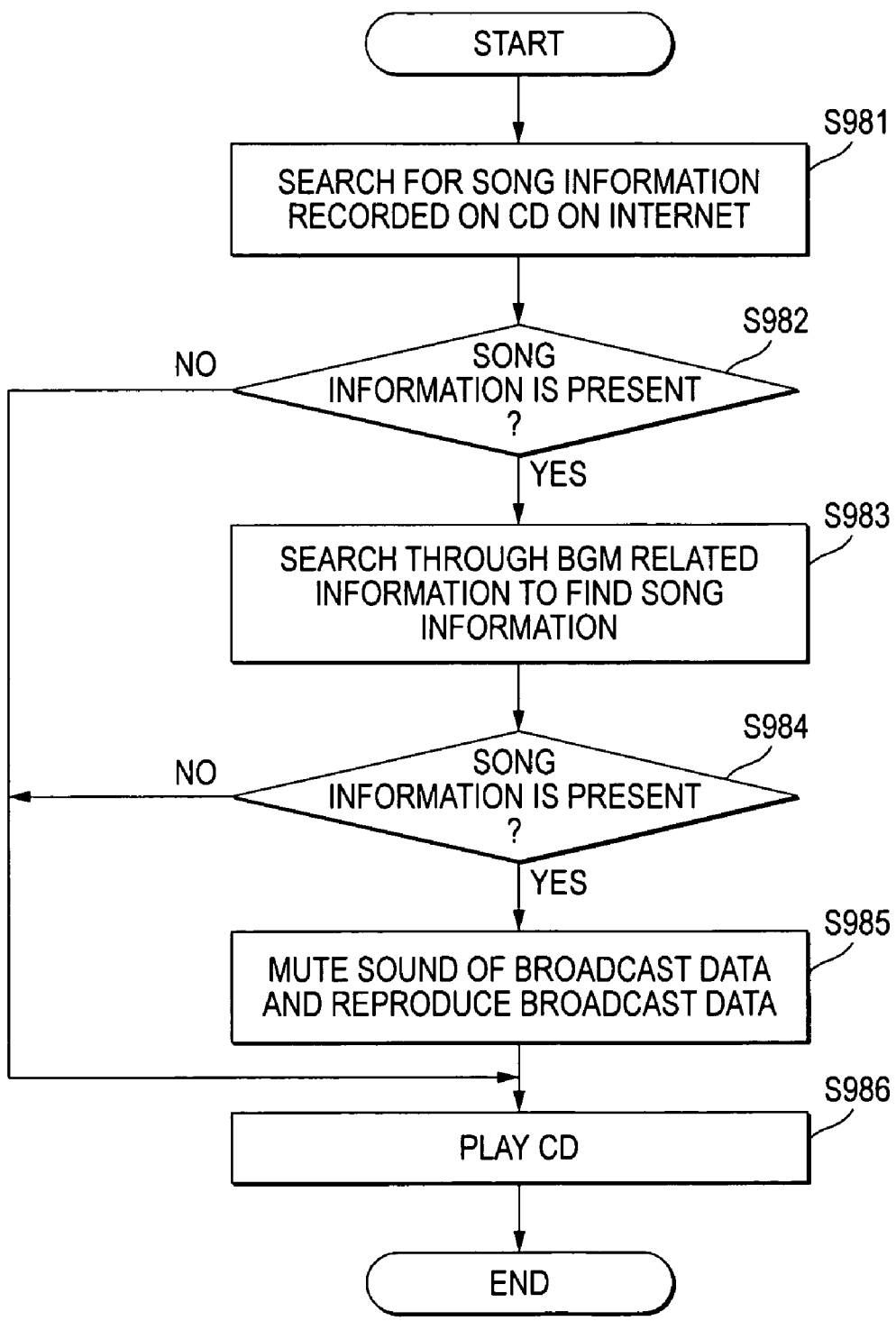
FIG. 20 is a flowchart of a flow of processing at the time when a music disk is inserted in the recording and reproducing apparatus 100 in the embodiment of the invention.

FIG. 20 is a diagram of a flow of processing at the time when a music disk is inserted in the recording and reproducing apparatus 100 in this embodiment. When the music disk is inserted in the recording and reproducing apparatus 100, the BGM related information acquiring module 333 transmits waveform data of song data in the music disk to the song information holding server 800 and causes the song information holding server 800 to search for song information corresponding to the waveform data of the song data transmitted on the basis of the waveform data (S981).

As a result of the search, when the song information is present (S982), the BGM related information acquiring module 333 acquires the information. The BGM related information managing module 334 searches through the BGM related information database 350 to find song information identical with the song information acquired (S983).

As a result of the search, when it is judged that song information identical with the song information acquired is present in the BGM related information database 350, the BGM reproduction/recording control requesting module 331 requests the reproduction/recording control module 380 to reproduce broadcast data corresponding to the song information. In response to the request, the reproduction/recording control module 380 performs mute processing (silencing processing) not to reproduce sound data included in the broadcast data and reproduces the broadcast data (S985). When there are plural broadcast data corresponding to the song information, the respective broadcast data are connected and reproduced. This makes it possible to create a digest of a drama. The reproduction/recording control module 380 also reproduces song data in the music disk (S986). When it is judges in steps S982 and S984 that song information is not present, the reproduction/recording control module 380 reproduces only song data in the music disk (S986).

In this way, according to this embodiment, it is possible to hold song data, broadcast data, and song information in association with one another on the basis of BGM data and display the song data, the broadcast data, and the song information using this association.

The song information used in the above explanation is metadata concerning a song. The association information is metadata in which broadcast data, music data, and song information are associated with one another. The detailed information concerning a song is metadata concerning the song. The detailed information concerning an artist is metadata concerning the artist. The song data sales information is metadata concerning sales of song data. The sales information concerning a commodity related to the song data is metadata concerning sales of the commodity related to the song data.

The embodiment of the invention indicates an example for embodying the invention. The components in the embodiment have correspondence relations with matters for defining the invention in claims, respectively, as described below. However, the invention is not limited to this. Various modifications of the invention are possible without departing from the sprit of the invention.

In claim 1, broadcast data holding means corresponds to, for example, the broadcast data holding unit 201. Music data detecting means corresponds to, for example, the music data detecting unit 202. First song information acquiring means corresponds to, for example, the song information acquiring unit 203. Association information creating means corresponds to, for example, the association information creating unit 204. Association information holding means corresponds to, for example, the association information holding unit 205.

In claim 4, song information holding means corresponds to, for example, the not-shown song information holding unit having the same function as the song information holding server 800.

In claim 7, song data acquiring means corresponds to, for example, the song data sales information acquiring unit 207 and the operation unit 208.

In claim 8, song data sales information acquiring means corresponds to, for example, the song data sales information acquiring unit 207. Operation means corresponds to, for example, the operation unit 208.

In claim 10, song data reproduction requesting means corresponds to, for example, the music data list creating unit 206 and the operation unit 208.

In claim 11, music data list creating means corresponds to, for example, the music data list creating unit 206. Operation means corresponds to, for example, the operation unit 208.

In claim 13, second song information acquiring means corresponds to, for example, the song information acquiring unit 203. Song information searching means corresponds to, for example, the song information searching unit 210. Song data reproducing means corresponds to, for example, the song data holding unit 209, the sound control unit 107, and the sound output unit 111.

In claim 14, receiving means corresponds to, for example, the receiving unit 102. Music data detecting means corresponds to, for example, the music data detecting unit 202. Song information acquiring means corresponds to, for example, the song information acquiring unit 203. Display control means corresponds to, for example, the display control unit 108 and the display unit 112.

In claim 16, broadcast data holding means corresponds to, for example, the broadcast data holding unit 201. Music data detecting means corresponds to, for example, the music data detecting unit 202. Song information acquiring means corresponds to, for example, the song information acquiring unit 203. Association information creating means corresponds to, for example, the association information creating unit 204. Association information holding means corresponds to, for example the association information holding unit 205. A song information holding server corresponds to, for example, the song information holding server 800.

In claim 17, a music data detecting step corresponds to, for example, steps S912 to S916. A song information acquiring step corresponds to, for example, steps S924 to S926. An association information creating step and an association information holding step correspond to, for example, step S928 or S931.

In claim 18, a receiving step corresponds to, for example, step S911. A music data detecting step corresponds to, for example, steps S912 to S916. A song information acquiring step corresponds to, for example, steps S924 to S926. A display step corresponds to, for example, step S927 or S930.

In claim 19, a music data detecting step corresponds to, for example, steps S912 to S916. A song information acquiring step corresponds to, for example, steps S924 to S926. An association information creating step and an association information holding step correspond to, for example, step S928 or S931.

In claim 20, a receiving step corresponds to step S911. A music data detecting step corresponds to, for example, steps S912 to S916. A song information acquiring step corresponds to, for example, steps S924 to S926. A display step corresponds to, for example, step S927 or S930.

The processing steps explained in the embodiment of the invention may be grasped as a method including the series of steps or may be grasped as a program for causing a computer to execute the series of steps or a recording medium having the program stored therein.

It should be understood by those skilled in the art that various modifications, combinations, sub-combinations, and alterations may occur depending on design requirements and other factors insofar as they are within the scope of the appended claims or the equivalents thereof.

What we claim is:

1. A recording and reproducing apparatus comprising:
   recording means for recording data distributed to the apparatus, said distributed data including video data and music data of background music in a television program;
   distributed data holding means including a computer readable media for holding data recorded by the recording means;
   music data detecting means including a processor for detecting a start time and an end time of the music data included in the data held in the distributed data holding means;
   first song information searching means for searching first song information including metadata concerning the music data of the background music on the basis of a characteristic waveform of the music data;
   association information creating means for creating association information in which the video data, the music data, the data held by the distributed data holding means from the start time to the end time of the music data, and the first song information are associated in computer readable memory with one another; and
   association information holding means for holding the association information for subsequent simultaneous display of the video data, playback of the background music and display of the first song information after retrieval of the information.

2. A recording and reproducing apparatus comprising:
   a distributed data holding unit that holds recorded distributed data, said distributed data including video data and music data of background music in a television program;
   a music data detecting unit including a processor programmed to detect a start time and an end time of music data included in the broadcast data;
   a first song information searching unit that searches first song information including metadata concerning the music data of the background music on the basis of a characteristic waveform of the music data;
   an association information creating unit that creates information in which the video data, the music data, the distributed data from the start time to the end time of the music data, and the first song information are associated with one another; and
   an association information holding unit that holds the information for subsequent simultaneous display of the video data, playback of the background music, and display of the first song information after retrieval of the information.

3. A recording and reproducing apparatus according to claim 2, wherein the music data detecting unit detects the start time and the end time of the music data on the basis of subtitle information in the data distributed to the apparatus.

4. A recording and reproducing apparatus according to claim 2, further comprising a song information holding unit that holds the first song information concerning the music data, wherein
   the song information searching unit searches the first song information from the song information holding unit on the basis of the music data.

5. A recording and reproducing apparatus according to claim 2, wherein the first song information searching unit searches a song name and an artist name of the music data as the first song information.

6. A recording and reproducing apparatus according to claim 5, wherein the first song information searching unit further searches detailed information concerning a song corresponding to the music data and detailed information concerning an artist corresponding to the music data as the first song information.

7. A recording and reproducing apparatus according to claim 2, further comprising song data acquiring means for acquiring song data that is data for one song corresponding to the music data.

8. A recording and reproducing apparatus according to claim 7, wherein the song data acquiring means includes:
   song data sales information acquiring means for acquiring information on sales of the song data; and
   operation means for causing a user to select the song data, which should be purchased, from the information.

9. A recording and reproducing apparatus according to claim 8, wherein the song data sales information acquiring means also acquires information on commodities related to the song data.

10. A recording and reproducing apparatus according to claim 7, further comprising:
    song data reproduction requesting means for requesting reproduction of the song data; and
    display control means for causing a display unit to display the data distributed to the apparatus that is held in association with the music data corresponding to the song data during reproduction of the song data.

11. A recording and reproducing apparatus according to claim 10, wherein the song data reproduction requesting means includes:
    music data list creating means for creating a list of the music data held by the association information holding means; and operation means for causing a user to select music data, which should be requested, from the list of the music data.

12. A recording and reproducing apparatus according to claim 10, wherein the display control means causes the display unit to appropriately connect and display the distributed data held in association with the music data corresponding to the song data during reproduction of the song data.

13. A recording and reproducing apparatus according to claim 2, further comprising:
   second song information acquiring means for acquiring, on the basis of song data recorded in a recording medium, second song information concerning the song data, the song data being data for one song corresponding to the music data;
   song information searching means for searching through the association information holding unit to find the first song information having content identical with that of the second song information;
   song data reproducing means for reproducing the song data when the first song information having content identical with that of the second song information is found in the search.

14. A distributed data processing method comprising the steps of:
   receiving and recording distributed data, said distributed data including video data and music data of background music in a television program;
   detecting with a processor a start time and an end time of the music data included in the distributed data;
   searching for song information including metadata concerning the music data of the background music on the basis of a characteristic waveform of the music data
   associating in a storage media information in which the video data, the music data, and the song information are associated with one another; and
   causing a display unit to simultaneously display the video data and the song information from the start time to the end time of the music data while playing back the background music.

15. A computer readable medium having computer readable instructions contained therein that when executed by a computer cause the computer to execute steps of:
   receiving and recording distributed data, said distributed data including video data and music data of background music in a television program;
   detecting with a processor a start time and an end time of the music data included in the distributed data;
   searching for song information including metadata concerning the music data of the background music on the basis of a characteristic waveform of the music data
   associating in a storage media information in which the video data, the music data, and the song information are associated with one another; and
   causing a display unit to simultaneously display the video data and the song information from the start time to the end time of the music data while playing back the background music.

* * * * *